US012772203B2

(12) United States Patent
Wang et al.

(10) Patent No.: US 12,772,203 B2
(45) Date of Patent: Oct. 20, 2026

(54) CELLULAR POSITIONING WITH LOCAL SENSORS USING NEURAL NETWORKS

(71) Applicant: GOOGLE LLC, Mountain View, CA (US)

(72) Inventors: Jibing Wang, San Jose, CA (US); Erik Richard Stauffer, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 195 days.

(21) Appl. No.: 18/690,049

(22) PCT Filed: Sep. 7, 2022

(86) PCT No.: PCT/US2022/042785
§ 371 (c)(1),
(2) Date: Mar. 7, 2024

(87) PCT Pub. No.: WO2023/038991
PCT Pub. Date: Mar. 16, 2023

(65) Prior Publication Data

US 2024/0397476 A1 Nov. 28, 2024

Related U.S. Application Data

(60) Provisional application No. 63/242,312, filed on Sep. 9, 2021.

(51) Int. Cl.
*H04W 64/00* (2009.01)
*G06N 3/098* (2023.01)
*H04W 8/22* (2009.01)

(52) U.S. Cl.
CPC .......... *H04W 64/006* (2013.01); *G06N 3/098* (2023.01); *H04W 8/22* (2013.01)

(58) Field of Classification Search
CPC ...... G01S 15/104; G01S 7/539; H04W 4/029; H04W 4/025; H04W 64/00; H04W 48/16;
(Continued)

(56) References Cited

U.S. PATENT DOCUMENTS

2013/0337845 A1 12/2013 Chen et al.
2020/0366537 A1 11/2020 Wang et al.
(Continued)

FOREIGN PATENT DOCUMENTS

| | | | |
|---|---|---|---|
| CN | 111866869 | A | 10/2020 |
| JP | 2016170012 | A | 9/2016 |
| WO | 2020213964 | A1 | 10/2020 |
| WO | 2021029889 | A1 | 2/2021 |
| WO | 2021029891 | A1 | 2/2021 |

OTHER PUBLICATIONS

Machine translation of Japanese Notice of Reasons for Refusal mailed on May 20, 2025 for JP Application No. 2024-515415, 5 pages.
(Continued)

*Primary Examiner* — Khai Tran

(57) ABSTRACT

A wireless communication system employs DNNs or other neural networks to provide for RAT-assisted positioning of UEs. A TX DNN at the BS generates and provides for wireless transmission of a reference signal to the UE. An RX DNN at the UE receives the reference signal and local UE sensor data as input, and from this input generates a UE measurement and sensor report. A TX DNN at the UE receives the report as an input, and from this input generates an RF signal representing the UE measurement and sensor report for transmission to the BS. An RX DNN at the BS receives the report from the RF signal as input, and from this input generates a position estimate of the UE.

18 Claims, 11 Drawing Sheets

(58) Field of Classification Search
CPC ...... H04B 17/318; H04B 17/101; G06N 3/02; G06N 3/0499; G06N 3/08; H04L 25/0254; H04L 41/16
USPC .......................................................... 455/456
See application file for complete search history.

(56) References Cited

U.S. PATENT DOCUMENTS

| | | | | |
|---|---|---|---|---|
| 2021/0049451 | A1 | 2/2021 | Wang et al. | |
| 2021/0158151 | A1 | 5/2021 | Wang et al. | |
| 2021/0266863 | A1 | 8/2021 | Alonso et al. | |
| 2021/0266875 | A1 | 8/2021 | Namgoong et al. | |
| 2021/0287547 | A1 | 9/2021 | Beauchamp | |
| 2021/0351885 | A1 | 11/2021 | Chavva et al. | |
| 2021/0360456 | A1* | 11/2021 | Ratnam | H04B 17/318 |
| 2022/0078581 | A1* | 3/2022 | Choi | G01S 5/0269 |
| 2022/0286215 | A1* | 9/2022 | Tokgoz | H04B 17/3913 |
| 2023/0421223 | A1* | 12/2023 | Li | H04B 17/3913 |

OTHER PUBLICATIONS

Catt, Further discussion of NR Hybrid Positioning Techniques, 3GPP TSG RAN WG1 #96 R11901984, Internet<URL:http://www.3gpp.org/ftp/tsg_ran/WG1_RL1/TSGR1_96/Docs/R11901984.zip>, Feb. 16, 2019, 7 pages.
Invitation to Pay Additional Fees mailed Jan. 16, 2023 for PCT/US2022/042785, 15 pages.
Vivo: "Study on AI/ML based air interface enhancement in Rel-18", 3GPP Draft; RWS-210170, 3rd Generation Partnership Project (3GPP), Mobile Competence Centre ; 650, Route Des Lucioles ; F-06921 Sophia-Antipolis Cedex ; France, vol. TSG RAN, No. Electronic Meeting; Jun. 28, 2021-Jul. 2, 2021 Jun. 7, 2021 (Jun. 7, 2021), XP052025729, 21 pages.
International Search Report and Written Opinion mailed Apr. 26, 2023 for PCT/US2022/042785, 20 pages.
International Preliminary Report on Patentability mailed Nov. 28, 2023 for PCT/US2022/042785, 14 pages.
Machine translation of Japanese Notice of Reasons for Refusal mailed May 18, 2026 for JP Application No. 2025-166231, 5 pages.

* cited by examiner

CELLULAR POSITIONING WITH LOCAL SENSORS USING NEURAL NETWORKS

CROSS-REFERENCE TO RELATED APPLICATIONS

The present application is a U.S. National Stage under 35 U.S.C. § 371 of International Patent Application Serial No. PCT/US2022/042785, entitled "CELLULAR POSITIONING WITH LOCAL SENSORS USING NEURAL NETWORKS" and filed on Sep. 7, 2022, which claims priority to U.S. Provisional Application No. 63/242,312, entitled "CELLULAR POSITIONING WITH LOCAL SENSORS USING NEURAL NETWORKS" and filed on Sep. 9, 2021, the entireties of which are incorporated by reference herein.

BACKGROUND

Accurate and robust positioning of cellular network devices, such as user equipment (UE), is often a significant contributor to the effective and efficient operation of cellular networks. High-accuracy (i.e., centimeter-level or smaller) UE positioning is of particular interest for various applications, such as augmented/virtual reality applications, sensor-based applications, and industrial applications. One technology that provides high-accuracy UE positioning is a global navigation satellite system (GNSS). However, GNSS typically suffers from interference, multi-path losses, and low signal-to-noise ratio (SNR) in urban and indoor environments. As such, cellular networks often complement or even replace GNSS and similar technologies with one or more other UE positioning techniques, such as radio access technology (RAT)—assisted UE positioning. For example, current and emerging cellular networks implement signaling or reference signals that a network component can use to perform UE positioning. The UE (or base station (BS)) performs various measurements on the reference signal(s) upon receiving a reference signal. The UE (or BS) sends the reference signal measurement(s) to one or more other network components, such as the BS (or a location server), that use the measurements to calculate an estimate of the UE's location.

SUMMARY OF EMBODIMENTS

In accordance with some embodiments, a computer-implemented method, in a first device, includes: receiving reference signal information as an input to a transmit neural network of the first device; generating, by the transmit neural network, a first output based on the reference signal information, the first output representing a reference signal; controlling a radio frequency (RF) antenna interface of the first device to transmit a first RF signal representative of the first output for receipt by a second device; responsive to transmitting the first RF signal, receiving, at a receive neural network of the first device, an input representing one or more RF signals associated with the second device; and generating, by the receive neural network, a second output representing a position estimate of the second device based on the input to the receive neural network.

In various embodiments, this method further can include one or more of the following aspects. Receiving the input representing one or more RF signals associated with the second device includes receiving a second RF signal from the second device representing signal measurements associated with the first RF signal. The second RF signal received from the second device further represents local sensor data generated at the second device. The position estimate indicates a location of the second device and an orientation of the second device. The first output further represents a downlink position reference signal including symbols dedicated to user equipment positioning. Generating the first output includes generating the first output at the transmit neural network based on a first neural network architectural configuration for the transmit neural network. The method further including selecting the first neural network architectural configuration from a plurality of neural network architectural configurations based on one or more capabilities of at least one of the first device or the second device. Selecting the first neural network architectural configuration includes: receiving information from the second device representing one or more capabilities of the second device; and using the information to select the first neural network architectural configuration. Generating the second output includes generating the second output at the receive neural network based on a second neural network architectural configuration for the receive neural network. The method also including selecting the second neural network architectural configuration from the plurality of neural network architectural configurations based on one or more capabilities of at least one of the first device or the second device. Selecting the selecting the second neural network architectural configuration includes: receiving information from the second device representing one or more capabilities of the second device; and using the information to select the second neural network architectural configuration. The method further including receiving a command from a managing infrastructure component to implement at least one of the first neural network architectural configuration for the transmit neural network or the second neural network architectural configuration for the receive neural network. The method also including responsive to a change in one or more capabilities of at least one of the first device or the second device, selecting at least one of a third neural network architectural configuration for the transmit neural network or a fourth neural network architectural configuration for the receive neural network. At least one of the transmit neural network and the receive neural network includes a deep neural network (DNN). The method further including participating in joint training of the transmit neural network and the receive neural network of the first device with a transmit neural network and a receive neural network of the second device. The method also including: communicating with a third device implementing a transmit neural network; and configuring the transmit neural network of the third device to generate an output representing a reference signal for receipt by the second device. The method further including: generating, at the receive neural network of the first device, a third output representing a position estimate of a fourth device based on one or more RF signals received from the fourth device; determining, at the receive neural network of the first device, the second output and the third output indicate that the second device and the fourth device occupy the same space; and responsive to the second output and the third output indicating the second device and the fourth device occupy the same space, refining one or more parameters of the receive neural network of the first device.

In accordance with some embodiments, a computer-implemented method, in a first device, includes: receiving, at a radio frequency (RF) antenna interface of the first device, a first RF signal from a second device, the first RF signal representative of a reference signal; providing a representation of the first RF signal as a first input to a receive neural network of the first device; and generating, by the receive neural network, a first output representing a measurement report at the first device based on the first input to the receive neural network.

In various embodiments, this method further can include one or more of the following aspects. Receiving as an input, at a transmit neural network of the first device, the first output from the receive neural network; generating, by the transmit neural network, a second output representing the measurement report; and controlling the RF antenna interface of the first device to transmit a second RF signal representative of the second output for receipt by the second device. Generating the first output includes performing one or more reference signal measurements on the first input representing the reference signal, wherein the measurement report includes at least one of the one or more reference signal measurements. The method further including providing a representation of sensor data generated by one or more sensors of the first device as a second input to the receive neural network of the first device. The measurement report including the one or more reference signal measurements fused with the sensor data. Generating the first output includes generating the first output at the receive neural network based on a first neural network architectural configuration for the receive neural network. The method also including selecting the first neural network architectural configuration from a plurality of neural network architectural configurations based on one or more capabilities of at least one of the first device or the second device. Selecting the first neural network architectural configuration includes: generating information representing that one or more capabilities of the first device have changed; and providing the information as input to the receive neural network. Generating the second output includes generating the second output at the transmit neural network based on a second neural network architectural configuration for the transmit neural network. The method further including selecting the second neural network architectural configuration from the plurality of neural network architectural configurations based on one or more capabilities of at least one of the first device or the second device. Selecting the second neural network architectural configuration includes: generating information representing that one or more capabilities of the first device have changed; and providing the information representing as input to the transmit neural network. The method also including receiving a command from a network infrastructure component to implement at least one of the first neural network architectural configuration for the receive neural network or the second neural network architectural configuration for the transmit neural network. The method further including: responsive to a change in one or more capabilities of the first device, transmitting a message to the network infrastructure component indicating the change in the one or more capabilities; and responsive to transmitting the message, receiving from the network infrastructure component, a second neural network architectural configuration for at least one of the receive neural network or the transmit neural network. At least one of the receive neural network and the transmit neural network includes a deep neural network (DNN). The method also including participating in joint training of the receive neural network and the transmit neural network of the first device with a receive neural network and a transmit neural network of the second device.

In accordance with some embodiments, a computer-implemented method includes: receiving capability information from at least one of a first device or a second device; selecting a pair of neural network architectural configurations from a set of candidate neural network architectural configurations based on the capability information, the pair of neural network architectural configurations being jointly trained to implement a cellular device positioning estimation process between the first device and the second device; transmitting to the first device a first indication of a first neural network architectural configuration of the pair for implementation at one or more of a transmit neural network and a receive neural network of the first device; and transmitting to the second device a second indication of a second neural network architectural configuration of the pair for implementation at one or more of a receive neural network and a transmit neural network of the second device.

In various embodiments, this method further can include one or more of the following aspects. At least one capability includes at least one of: an antenna array capability; a processing capability; a power capability; a temperature-related capability; or a sensor capability. The transmit neural network and the receive neural network of the first device and the transmit neural network and the receive neural network of the second device each includes a deep neural network (DNN).

In some embodiments, a device includes a radio frequency (RF) antenna interface; at least one processor coupled to the RF antenna interface; and a memory storing executable instructions, the executable instructions configured to manipulate the at least one processor to perform any of the methods described above and herein.

BRIEF DESCRIPTION OF THE DRAWINGS

The present disclosure is better understood and its numerous features and advantages are made apparent to those skilled in the art by referencing the accompanying drawings. The use of the same reference symbols in different drawings indicates similar or identical items.

DETAILED DESCRIPTION

Figure 1:
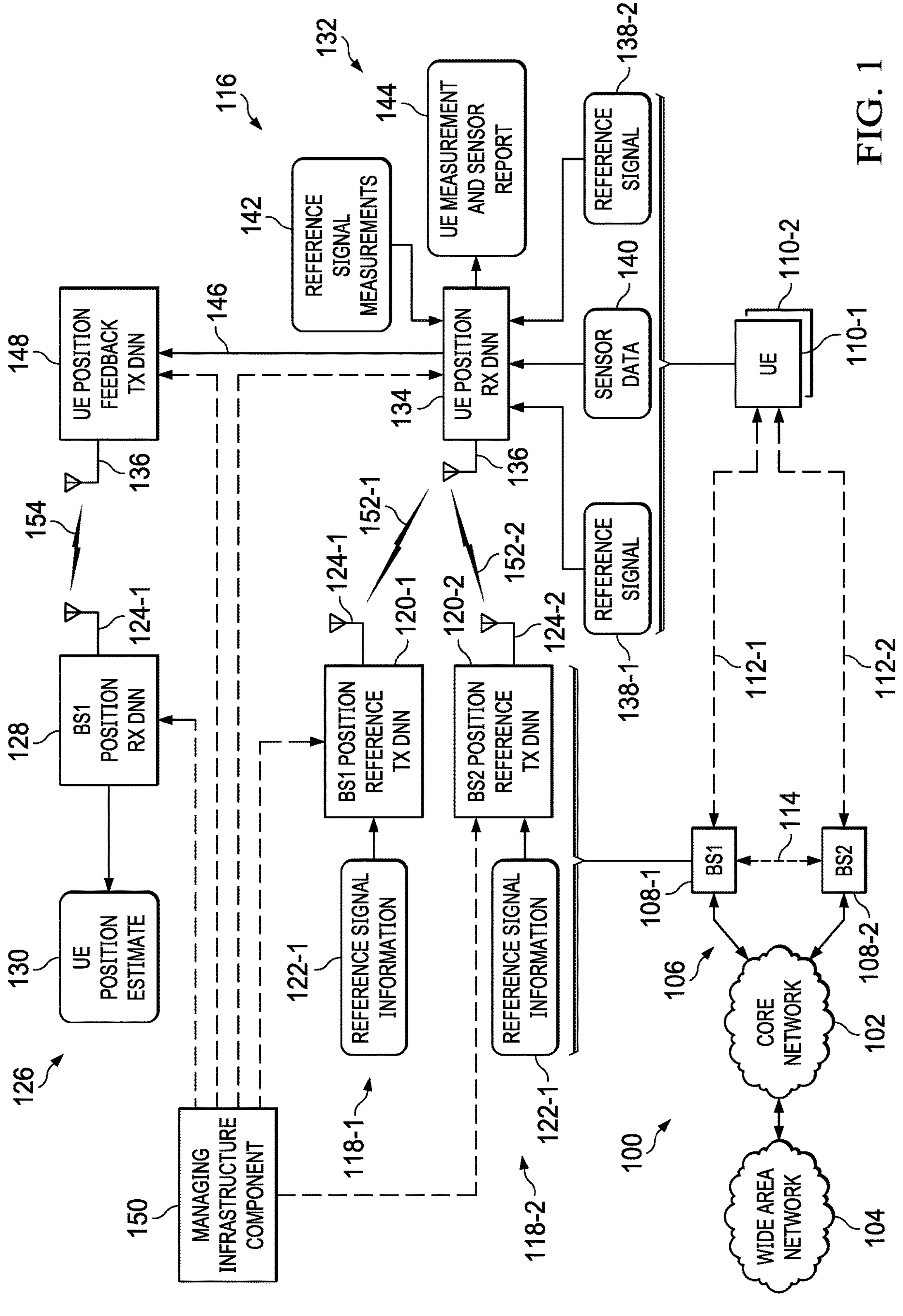
FIG. 1 is a diagram illustrating an example wireless system employing a UE positioning neural network architecture for calculating a position estimation of one or more UEs in accordance with some embodiments.

RAT-assisted UE positioning in a conventional wireless communication system typically relies on a series of processing stages/blocks, such as reference signal transmission, reference signal measuring, reference signal measurement reporting, and UE position estimation. Design, testing, and implementation of these processing stages are relatively separate from each other. This custom and independent design approach for each process stage usually results in excessive complexity, resource consumption, and overhead. Also, conventional RAT-assisted UE positioning techniques are generally based on reference signal measurements calculated by a UE or, in some instances, by a BS or other infrastructure network component. However, UEs often include various local sensors, such as global positioning satellite (GPS)/global navigation satellite system (GNSS) chipsets, cameras, object detection sensors, accelerometers, inertial measurement units (IMUs), altimeters, temperature sensors, barometers, and the like. Information or data from these UE sensors can improve the accuracy of RAT-assisted UE positioning techniques.

As such, rather than take a handcrafted approach for each process stage, the following describes example systems and techniques that utilize an end-to-end neural network configuration for RAT-assisted UE positioning that provides for rapid development and deployment in addition to increased efficiency and accuracy over conventional RAT-assisted UE positioning techniques. Conventional processing stages for RAT-assisted UE positioning are replaced by, or supplemented by, jointly trained neural networks that operate to fuse sensor data from available sensors of a UE with UE reference signal measurements (or signals) to generate more accurate and meaningful UE position estimates. For example, by processing UE-provided reference signal measurements (or signals) fused with UE local sensor information, a BS (or other network component, such as a location server) can generate UE position estimates that incorporate a local circumstance of a UE, indicate the orientation of a UE, and/or include second-order information, such as movement (e.g., rotation, heading, velocity, etc.). Thus, the jointly trained neural network architecture includes a set of neural networks, each of which has been trained to, in effect, provide more accurate and efficient UE positioning than conventional sequences of RAT-assisted UE positioning stages without having to be specifically designed and tested for that sequence of RAT-assisted UE positioning stages. In at least some embodiments, the jointly trained neural network architecture implements one or more processes of the RAT-assisted UE positioning techniques, such as the reference signal transmission process, reference signal measurement process, local UE sensor information collection and fusion process, reference signal measurement and sensor reporting process, and UE position estimation process.

In at least some embodiments, the wireless system can employ joint training of multiple candidate neural network architectural configurations for the various neural networks employed among the BSs and UEs based on any of a variety of parameters, such as the operating characteristics of (e.g., frequency, bandwidth, etc.) of a BS, UE reported reference signal received power (RSRP), doppler estimate, deployment information, compute resources, sensor resources, power resources, antenna resources, other capabilities, and the like. Thus, the particular neural network configuration employed at each of BS and UE may be selected based on correlations between the particular configuration of these devices and the parameters used to train corresponding neural network architectural configurations.

FIG. 1 illustrates a wireless communications system 100 employing neural-network-facilitated UE positioning in accordance with some embodiments. As depicted, the wireless communication system 100 is a cellular network including a core network 102 coupled to one or more wide area networks (WANs) 104 or other packet data networks (PDNs), such as the Internet. The wireless communications system 100 further includes one or more BSs 108 (illustrated as BSs 108-1 and 108-2), with each BS 108 supporting wireless communication with one or more UEs 110 (illustrated as UEs 110-1 and 110-2) through one or more wireless communication links 112 (illustrated as communication links 112-1 and 112-2), which may be unidirectional or bi-directional. In at least some embodiments, each BS 108 is configured to communicate with the UE 110 through the wireless communication links 112 via radio frequency (RF) signaling using one or more applicable RATs as specified by one or more communications protocols or standards. As such, each BS 108 operates as a wireless interface between the UE 110 and various networks and services provided by the core network 102 and other networks, such as packet-switched (PS) data services, circuit-switched (CS) services, and the like. Conventionally, communication of data or signaling from a BS 108 to the UE 110 is referred to as "downlink" or "DL", whereas communication of data or signaling from the UE 110 to a BS 108 is referred to as "uplink" or "UL". In at least some embodiments, a BS 108 also includes an inter-base station interface 114, such as an Xn and/or X2 interface configured to exchange user-plane and control-plane data between another BS 108.

Each BS 108 can employ any of a variety or combination of RATs, such as operating as a NodeB (or base transceiver station (BTS)) for a Universal Mobile Telecommunications System (UMTS) RAT (also known as "3G"), operating as an enhanced NodeB (eNodeB) for a Third Generation Partnership Project (3GPP) Long Term Evolution (LTE) RAT, operating as a 5G node B ("gNB") for a 3GPP Fifth Generation (5G) New Radio (NR) RAT, and the like. The UE 110, in turn, can implement any of a variety of electronic devices operable to communicate with the BS 108 via a suitable RAT, including, for example, a mobile cellular phone, a cellular-enabled tablet computer or laptop computer, a desktop computer, a cellular-enabled video game system, a server, a cellular-enabled appliance, a cellular-enabled automotive communications system, a cellular-enabled smartwatch or other wearable device, and the like.

In at least some embodiments, the UE 110 employs one or more positioning technologies, such as GNSS, to obtain high-accuracy positioning information associated with the UE 110. However, GNSS typically suffers from interference, multi-path, and low signal-to-noise ratio in urban and indoor environments. The wireless communications system 100, in at least some embodiments, can complement or even replace GNSS and similar technologies with one or more other UE positioning techniques, such as RAT-assisted UE positioning, to overcome the difficulties associated with GNSS. RAT-assisted UE positioning is based, at least partly on, signaling or reference signals generated and transmitted by, for example, a BS 108 or UE 110. Examples of these reference signals include positioning reference signals (PRS), channel state information reference signals (CSI-RS), synchronization/physical broadcast channel blocks (SS/PBCH), and sounding reference signals (SRS). RAT-assisted UE positioning, in at least some embodiments, typically involves a BS 108 transmitting a reference signal(s) to a UE 110 (or vice versa). Then, the UE 110 (or BS 108) performs various measurements on the reference signal(s). Examples of reference signal measurements include signal strength, reference signal time difference measurement (RSTD) for observed time difference of arrival (OTDoA), uplink time difference of arrival (UTDoA), timing advance (TDAV), angle of arrival (AoA), angle of departure (AoD), round trip time (RTT), and the like. The UE 110 (or BS 108) sends the reference signal measurement(s) to one or more other network components, such as the BS 108 (or a location server), that use the measurements to calculate an estimate of the UE's location.

As described above, RAT-assisted UE positioning in a conventional wireless communication system typically relies on a series of processing stages/blocks that result in excessive complexity, resource consumption, and overhead. Also, conventional RAT-assisted UE positioning techniques generally do not consider UE sensor data when calculating UE position estimates. Accordingly, in at least one embodiment, the BS 108 and the UE 110 implement transmitter (TX) and receiver (RX) processing paths that integrate one or more neural networks (NNs) that are trained or otherwise configured to facilitate RAT-assisted UE positioning. The NNs, in at least one configuration, fuse sensor data from available sensors of a UE 110 with UE reference signal measurements (or signals) to generate more accurate and meaningful UE position estimates than conventional RAT-assisted UE positioning mechanisms. To illustrate, with respect to a RAT-assisted UE positioning path 116 (or "UE positioning path 116" for purposes of brevity) established between one or more BSs 108 and UEs 110, the BS 108 employs a TX processing path 118 (illustrated as processing paths 118-1 and 118-2) having a BS position reference TX DNN 120 (illustrated as TX DNNs 120-1 and 120-2) or other neural network. The BS position reference TX DNN 120 has an input configured to receive reference signal information 122 (illustrated as information 122-1 and 122-2) for generating a reference signal 138, such as a position reference signal (PRS). The BS position reference TX DNN 120 also includes an output coupled to an RF front end 124 (illustrated as RF front ends 124-1 and 124-2) of the BS 108. The BS 108 further employs an RX processing path 126 having a BS position RX DNN 128 or other neural network. The BS position RX DNN 128 has an input coupled to the RF front end 124 and an output configured to generate UE position estimates 130.

The UE 110 employs an RX processing path 132 having a UE position reference RX DNN 134 or other neural network. The UE position reference RX DNN 134 has an input coupled to an RF front end 136. The input of the UE position reference RX DNN 134 is configured to receive, for example, at least one reference signal 138 (illustrated as reference signals 138-1 and 138-2) or other reference signal from one or more BSs 108, local sensor data 140, and the like. The UE position reference RX DNN 134 also has an output configured to generate UE measurement and sensor reports 144 based on inputs to the UE position reference RX DNN 134. The UE 110 further employs a TX processing path 146 having a UE position feedback TX DNN 148 or other neural network. The UE position feedback TX DNN 148 has an input coupled to the output of the UE position reference RX DNN 134 and further has an output coupled to the RF front end 136. In at least some embodiments, a serving BS 108-1 (or another cellular network component) configures the UE position reference RX DNN 134 and the UE position feedback TX DNN 148 of the UE 110 based on the serving cell's operating characteristics, UE reported RSRP, doppler estimate, deployment information, and the like. The UE 110, in at least some embodiments, receives the particular neural network architecture from the serving BS 108-1 (or other network component) via one or more control messages, such as an RRC message.

In operation, the BS position reference TX DNN 120, BS position RX DNN 128, UE position reference RX DNN 134, UE position feedback TX DNN 148, or a combination thereof are jointly trained or otherwise configured together to perform one or more of the RAT-assisted UE positioning operations. In at least some embodiments, the BS position reference TX DNN 120 receives reference signal information 122 as input. The BS position reference TX DNN 120 produces a reference signal 138 output from the reference signal information 122 (and any other inputs) suited for RF transmission to the UE 110 and processing by the UE position reference RX DNN 134 of the UE 110. The reference signal 138 output, in at least one embodiment, represents a positioning reference signal, which is a downlink position reference signal including symbols dedicated to UE positioning. However, the reference signal 138 output may represent other types of references signals, such as a CSI-RS or a SS/PBCH. As part of this joint training or other configuration, the BS position reference TX DNN 120, in at least one embodiment, is trained or otherwise configured to, in effect, generate and configure a reference signal 138 or other reference signal for transmission by the BS 108 to the UE 110. Accordingly, the BS position reference TX DNN 120 provides the reference signal 138 as output to the RF front end 124 of the BS 108. The RF front end 124 processes the output, converts the processed output to an analog signal and modulates the analog signal with the appropriate carrier frequency for RF transmission 152 (illustrated as RF transmissions 152-1 and 152-2) of the reference signal 138 to the UE 110.

In at least some embodiments, multiple BSs 108 are configured with corresponding BS position reference TX DNNs 120 for generating and transmitting a reference signal 138 to the UE 110. In such embodiments, a first BS acts as a serving/reference BS 108-1, and the remaining BSs are neighbor BSs 108-2. The serving BS 108-1 can communicate with each neighbor BS 108-2 via the inter-base station interface 114 to configure the BS position reference TX DNN 120-2 of the neighbor BSs 108-2. For example, the serving BS 108-1 can configure the BS position reference TX DNN 120-2 of a neighbor BS 108-2 based on the serving cell's operating characteristics (e.g., frequency, bandwidth, etc.), UE reported RSRP, doppler estimate, deployment information (e.g., urban/rural deployment or whether angular estimation is to be performed by the BS 108), and the like. In another embodiment, if a BS 108 includes multiple antenna arrays, each antenna array can be associated with a BS position reference TX DNN 120. The serving BS 108-1, in at least some embodiments, implements the BS position RX DNN 128 in addition to the BS position reference TX DNN 120.

At the UE 110, one or more components perform reference signal measurements 142, such as RSRP, RSTD, OTDoA, UTDOA, TDAV, AoA, AOD, RTT, and the like, on the received reference signal 138. The UE 110 provides the reference signal measurements 142 as input to the UE position reference RX DNN 134. Alternatively, the RF front end 136 can provide the reference signal 138 (or a representation thereof) as an input to the UE position reference RX DNN 134. The UE position reference RX DNN 134 can then calculate one or more reference signal measurements 142 for the reference signal 138. In at least some embodiments, other inputs, such as sensor data 140 from sensors of the UE 110, are concurrently provided as inputs to the UE position reference RX DNN 134. Examples of sensor data 140 input include GPS data, camera data, accelerometer data, IMU data, altimeter data, temperature data, barometer data, object detection sensors (e.g., radar sensors, lidar sensors, imaging sensors, or structured-light-based depth sensors), and the like. From these inputs, and based on the joint training or other configuration, the UE position reference RX DNN 134 operates to output a UE measurement and sensor report 144 associated with the UE 110. For example, the UE position reference RX DNN 134 processes the reference signal measurements 142 or the reference signal 138 itself to generate an output representing a UE measurement and sensor report 144. In other embodiments, the UE position reference RX DNN 134 also processes the sensor data 140 input and fuses the sensor data 140 input with the reference signal measurement(s) to generate an output representing the UE measurement and sensor report 144.

The UE position reference RX DNN 134 provides the output representing the UE measurement and sensor report 144 to the UE position feedback TX DNN 148 as input. From this input, the UE position feedback TX DNN 148 generates an output representing the UE measurement and sensor report 144 and provides the output to the RF front end 136 of the UE 110. The RF front end 136 transceiver processes the output for generating and transmitting an RF signal 154 (wireless communication) including the UE measurement and sensor report 144 to the serving BS 108-1. The UE 110 can use various messaging mechanisms, such as the Radio Resource Control (RRC) protocol, Long Term Evolution (LTE) Positioning Protocol (LPP), and the like, for configuring and transmitting the RF signal 154 to the serving BS 108-1. Accordingly, the UE position feedback TX DNN 148 of the UE 110 provides the generated output to the RF front end 136, whereupon it is processed, converted to an analog signal, and then modulated with the appropriate carrier frequency for RF transmission to the serving BS 108-1.

At the serving BS 108-1, the RF front end 124 receives the RF signal 154 from the UE 110 and converts the RF signal 154 to a digital signal representing the UE measurement and sensor report 144. Next, the RF front end 124 provides the digital signal as an input to the BS position RX DNN 128 of the serving BS 108-1. From this input, and based on the joint training or other configuration, the BS position RX DNN 128 operates to output a UE position estimate 130 associated with the UE 110. For example, the BS position RX DNN 128 processes the reference signal measurement(s) and UE sensor data 140 from the UE measurement and sensor report 144 received as input. From these inputs, the BS position RX DNN 128 generates an output representative of a position estimate 130 for the UE 110. The UE position estimate 130, in at least some embodiments, not only incorporates the reference signal measurement(s) 142 provided by the UE 110 but also incorporates the UE sensor data 140, resulting in a UE position estimate that includes, for example, a local circumstance of the UE, an indication of the UE orientation, second-order information, such as movement (e.g., rotation, heading, etc.), and/and the like. As such, by considering the UE sensor data 140, the serving BS 108-1 can generate more accurate and meaningful UE position estimates than conventional RAT-assisted positioning techniques. In at least some embodiments, the serving BS 108-1 processes the UE position estimate 130 or transmits the UE position estimate 130 to one or more other components of the wireless communications system 100 for further processing.

In at least some embodiments, the serving BS 108-1 may receive signals from multiple UEs 110 that each includes a UE measurement and sensor report 144 or a UE measurement report (without UE sensor data) associated with a different UE 110. In these embodiments, the BS position RX DNN 128 of the serving BS 108-1 compares the UE position estimates 130 calculated for two or more separate UEs 110 to determine if the position estimates 130 indicate that the separate UEs 110 occupy the same space. If the position estimates 130 indicate that two or more separate UEs 110 occupy the same space, the serving BS 108-1 (or another cellular network component) determines that the BS position RX DNN 128 has made a positioning error and should be refined since multiple separate objects cannot occupy the same physical space. The serving BS 108-1 (or another cellular network component) proceeds to adjust one or more parameters of the BS position RX DNN 128, such as the weights, to correct the identified positioning error.

Although the techniques described include a BS 108 transmitting a reference signal to a UE 110, the UE 110 can similarly transmit a reference signal to a BS 108. In this configuration, the UE position feedback TX DNN 148 or other TX DNN of the UE 110 is configured similar to the BS position reference TX DNN 120 of a BS 108 for transmitting reference signals, such as an SRS. The UE position feedback TX DNN 148 of the UE 110 can also augment the reference signal with sensor data 140 from one or more sensors available at the UE 110 and generate an output representing the augmented reference signal. The UE 110 then transmits the augmented reference signal to the serving BS 108-1. The BS position RX DNN 128-1 of the serving BS 108-1, in at least one configuration, performs one or more measurements on the reference signal received from the UE 110 and calculate a UE position estimate 130 based on the reference signal measurements and the UE sensor data 140 received as part of the UE transmitted augmented reference signal. In an alternative embodiment, rather than process augmented reference signals or measurement and sensor reports at the BS 108, a TX neural network at the BS 108, in at least one configuration, transmits locally generated augmented reference signal measurements (or UE provided measurement and sensor reports) to the managing component 150. In this embodiment, the managing component 150 implements an RX neural network configured to process the reference signal measurements and UE sensor data received from the BS 108 to calculate a UE position estimate.

As noted above and described in greater detail herein, both the BS 108 and the UE 110, respectively, employ one or more DNNs or other neural networks that are jointly trained and selected based on context-specific parameters to facilitate the overall RAT-assisted UE positioning process. To manage the joint training, selection, and maintenance of these neural networks, the system 100, in at least one embodiment, further includes a managing infrastructure component 150 (or "managing component 150" for purposes of brevity). This managing component 150 can include, for example, a server or other component within a network infrastructure 106 of the wireless communication system 100, such as within the core network 102 or a WAN 104. Further, although depicted in the illustrated example as a separate component, the BS 108, in at least some embodiments, implements the managing component 150. The oversight functions provided by the managing component 150 can include, for example, some or all of overseeing the joint training of the neural networks, managing the selection of a particular neural network architecture configuration for the BSs 108 or the UE 110 based on their specific capabilities or other component-specific parameters, receiving and processing capability updates for purposes of neural network configuration selection, receiving and processing feedback for purposes of neural network training or selection, and the like.

Figure 4:
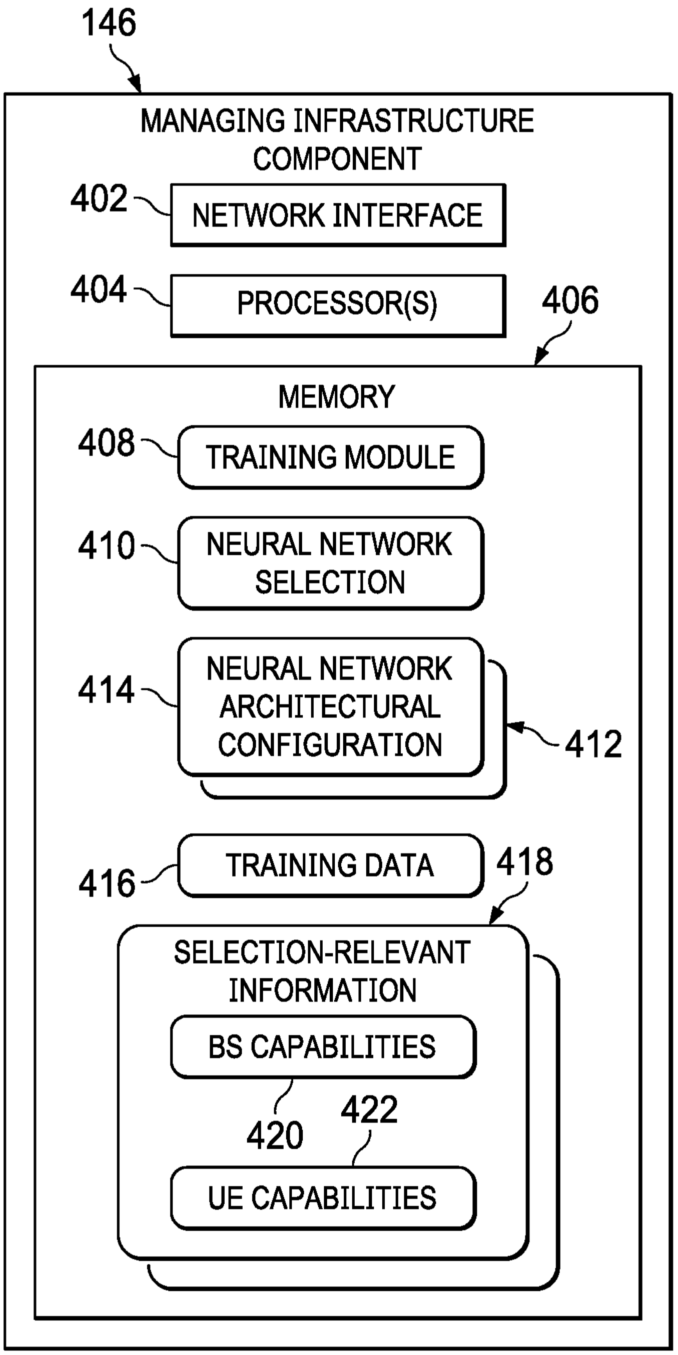
FIG. 4 is a diagram illustrating an example hardware configuration of a managing infrastructure component of the wireless system of FIG. 1 in accordance with some embodiments.

As described below in more detail with respect to FIG. 4, the managing component 150, in some embodiments, maintains a set 412 (FIG. 4) of candidate neural network architectural configurations 414 (FIG. 4). The managing component 150 (or other network component) may select the candidate neural network architectural configurations 414 to be employed at a particular component in the corresponding RAT-assisted UE positioning path based at least in part on the current capabilities of the component implementing the corresponding neural network, the current capabilities of other components in the transmission chain, the current capabilities of other components in the receiving chain or a combination thereof. These capabilities can include, for example, sensor capabilities, processing resource capabilities, battery/power capabilities, RF antenna capabilities, capabilities of one or more accessories of the component, and the like. The information representing these capabilities for the BSs 108 and the UE 110 is obtained by and stored at the managing component 150 as BS capability information 420 (FIG. 4) and UE capability information 422 (FIG. 4), respectively. The managing component 150 further may consider parameters or other aspects of the corresponding channel or the propagation channel of the environment, such as the carrier frequency of the channel, the known presence of objects or other interferers, and the like.

In support of this approach, in some embodiments, the managing component 150 can manage the joint training of different combinations of candidate neural network architectural configurations 414 for different capability/context combinations. The managing component 150 then can obtain capability information 420 from the BS 108, capability information 422 from the UE 110, or both, and from this capability information, the managing component 150 selects neural network architectural configurations from the set 412 of candidate neural network architectural configurations 414 for each component at least based in part on the corresponding indicated capabilities, RF signaling environment, and the like. In at least some embodiments, the managing component 150 (or other network component) jointly trains the candidate neural network architectural configurations as paired subsets, such that each candidate neural network architectural configuration for a particular capability set for the BS 108 is jointly trained with a single corresponding candidate neural network architectural configuration for a particular capability set for the UE 110. In other embodiments, the managing component 150 (or other network component) the candidate neural network architectural configurations such that each candidate configuration for the BS 108 has a one-to-many correspondence with multiple candidate configurations for the UE 110 and vice versa.

Thus, the system 100 utilizes a RAT-assisted UE positioning approach that relies on a managed, jointly trained, and selectively employed set of neural networks between one or more BSs 108 and one or more UEs 110 for UE positioning, rather than independently-designed process blocks that may not have been specifically designed for compatibility. Not only does this provide for improved flexibility, but in some circumstances can provide for more rapid processing at each device, as well as more accurate UE position estimation and more efficient transmission and processing of reference signals and UE measurement and sensor reports.

Figure 2:
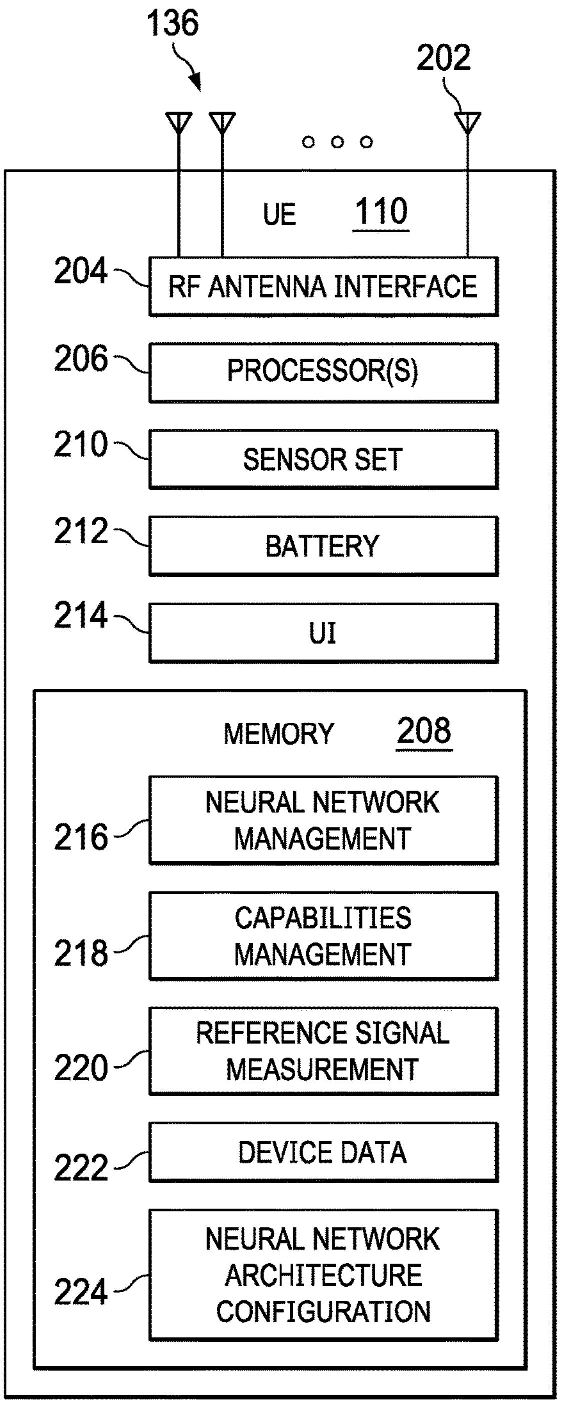
FIG. 2 is a diagram illustrating example hardware configuration of a UE of the wireless system of FIG. 1 in accordance with some embodiments.

FIG. 2 illustrates example hardware configurations for the UE 110 in accordance with some embodiments. Note that the depicted hardware configuration represents the processing components and communication components most directly related to the neural-network-based processes of one or more embodiments and omit certain components well-understood to be frequently implemented in such electronic devices, such as displays, non-sensor peripherals, external power supplies, and the like.

In the depicted configuration, the UE 110 includes the RF front end 136 having one or more antennas 202 and an RF antenna interface 204 having one or more modems to support one or more RATs. The RF front end 136 operates, in effect, as a physical (PHY) transceiver interface to conduct and process signaling between one or more processors 206 of the UE 110 and the antennas 202 to facilitate various types of wireless communication. The antennas 202 can be arranged in one or more arrays of multiple antennas configured similar to or different from each other and can be tuned to one or more frequency bands associated with a corresponding RAT. The one or more processors 206 can include, for example, one or more central processing units (CPUs), graphics processing units (GPUs), tensor processing units (TPUs) or other application-specific integrated circuits (ASIC), and the like. To illustrate, the processors 206 can include an application processor (AP) utilized by the UE 110 to execute an operating system and various user-level software applications, as well as one or more processors utilized by modems or a baseband processor of the RF front end 136. The UE 110 further includes one or more computer-readable media 208 that include any of a variety of media used by electronic devices to store data and/or executable instructions, such as random access memory (RAM), read-only memory (ROM), caches, Flash memory, solid-state drive (SSD) or other mass-storage devices, and the like. For ease of illustration and brevity, the computer-readable media 208 is referred to herein as "memory 208" in view of frequent use of system memory or other memory to store data and instructions for execution by the processor 206, but it will be understood that reference to "memory 208" shall apply equally to other types of storage media unless otherwise noted.

In at least one embodiment, the UE 110 further includes a plurality of sensors, referred to herein as a sensor set 210, at least some of which are utilized in the neural-network-based schemes of one or more embodiments. Generally, the sensors of the sensor set 210 include those sensors that sense some aspect of the environment of the UE 110 or the use of the UE 110 by a user which have the potential to sense a parameter that has at least some impact on or reflects, for example, a location of the UE 110, an orientation of the UE 110, movement, or a combination thereof. The sensors of the sensor set 210 can include one or more sensors for object detection, such as radar sensors, lidar sensors, imaging sensors, structured-light-based depth sensors, and the like. The sensor set 210 also can include one or more sensors for determining a position or pose/orientation of the UE 110, such as satellite positioning sensors such as GPS sensors, Global Navigation Satellite System (GNSS) sensors, internal measurement unit (IMU) sensors, visual odometry sensors, gyroscopes, tilt sensors or other inclinometers, ultra-wideband (UWB)-based sensors, and the like. Other examples of types of sensors of the sensor set 210 can include environmental sensors, such as temperature sensors, barometers, altimeters, and the like or imaging sensors, such as cameras for image capture by a user, cameras for facial detection, cameras for stereoscopy or visual odometry, light sensors for detection of objects in proximity to a feature of the device, object detection sensors (e.g., radar sensors, lidar sensors, imaging sensors, or structured-light-based depth sensors), and the like. The UE 110 further can include one or more batteries 212 or other portable power sources, as well as one or more user interface (UI) components 214, such as touch screens, user-manipulable input/output devices (e.g., "buttons" or keyboards), or other touch/contact sensors, microphones, or other voice sensors for capturing audio content, image sensors for capturing video content, thermal sensors (such as for detecting proximity to a user), and the like.

The one or more memories 208 of the UE 110 store one or more sets of executable software instructions and associated data that manipulate the one or more processors 206 and other components of the UE 110 to perform the various functions attributed to the UE 110. The sets of executable software instructions include, for example, an operating system (OS) and various drivers (not shown), and various software applications. The sets of executable software instructions further include one or more of a neural network management module 216, a capabilities management module 218, or a reference signal measurement module 220. The neural network management module 216 implements one or more neural networks for the UE 110, as described in detail below. The capabilities management module 218 determines various capabilities of the UE 110 that may pertain to neural network configuration or selection and reports such capabilities to the managing component 150, as well as monitors the UE 110 for changes in such capabilities, including changes in RF and processing capabilities, changes in accessory availability or capability, changes in sensor availability, and the like, and manages the reporting of such capabilities, and changes in the capabilities, to the managing component 150. As similarly described above, the reference signal measurement module 220 operates to generate signal measurements, such as RSRP, RSTD, OTDoA, UTDoA, TDAV, AoA, AOD, RTT, and the like for reference signals received from one or more BSs 108.

To facilitate the operations of the UE 110, the one or more memories 208 of the UE 110 further can store data associated with these operations. This data can include, for example, device data 222 and one or more neural network architecture configurations 224. The device data 222 represents, for example, user data, multimedia data, beamforming codebooks, software application configuration information, and the like. The device data 222 further can include capability information for the UE 110, such as sensor capability information regarding the one or more sensors of the sensor set 210, including the presence or absence of a particular sensor or sensor type, and, for those sensors present, one or more representations of their corresponding capabilities, such as range and resolution for lidar or radar sensors, image resolution and color depth for imaging cameras, and the like. The capability information further can include information regarding, for example, the capabilities or status of the battery 212, the capabilities or status of the UI 214 (e.g., screen resolution, color gamut, or frame rate for a display), and the like.

The one or more neural network architecture configurations 224 represent UE-implemented examples selected from the set 412 of candidate neural network architectural configurations 414 maintained by the managing component 150. Each neural network architecture configuration 224 includes one or more data structures containing data and other information representative of a corresponding architecture and/or parameter configurations used by the neural network management module 216 to form a corresponding neural network of the UE 110. The information included in a neural network architectural configuration 224 includes, for example, parameters that specify a fully connected layer neural network architecture, a convolutional layer neural network architecture, a recurrent neural network layer, a number of connected hidden neural network layers, an input layer architecture, an output layer architecture, a number of nodes utilized by the neural network, coefficients (e.g., weights and biases) utilized by the neural network, kernel parameters, a number of filters utilized by the neural network, strides/pooling configurations utilized by the neural network, an activation function of each neural network layer, interconnections between neural network layers, neural network layers to skip, and so forth. Accordingly, the neural network architecture configuration 224 includes any combination of NN formation configuration elements (e.g., architecture and/or parameter configurations) for creating a NN formation configuration (e.g., a combination of one or more NN formation configuration elements) that defines and/or forms a DNN.

Figure 3:
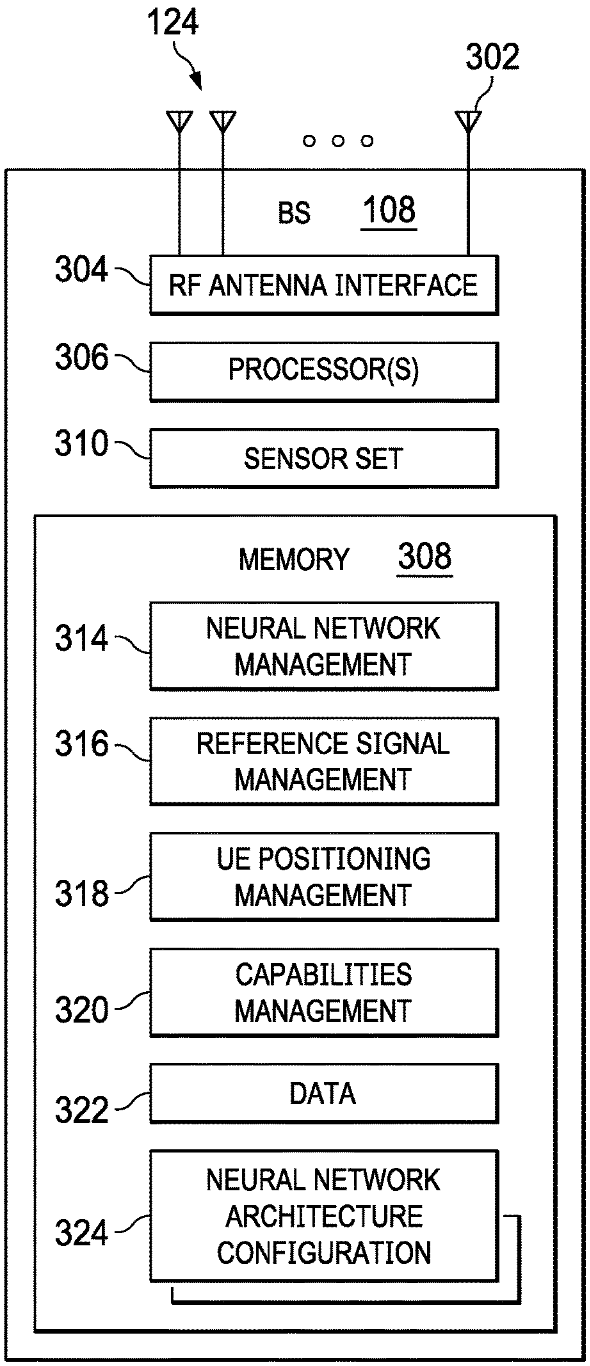
FIG. 3 is a diagram illustrating example hardware configuration of a BS of the wireless system of FIG. 1 in accordance with some embodiments.

FIG. 3 illustrates example hardware configurations for the BS 108 in accordance with some embodiments. Note that the depicted hardware configuration represents the processing components and communication components most directly related to the neural-network-based processes of one or more embodiments and omit certain components well-understood to be frequently implemented in such electronic devices, such as displays, non-sensor peripherals, external power supplies, and the like. Further note that although the illustrated diagram represents an implementation of the BS 108 as a single network node (e.g., a 5G NR Node B, or "gNB"), the functionality, and thus the hardware components, of the BS 108 instead may be distributed across multiple network nodes or devices and may be distributed in a manner to perform the functions of one or more embodiments.

In the depicted configuration, the BS 108 includes the RF front end 124 having one or more antennas 302 and an RF antenna interface (or front end) 304 having one or more modems to support one or more RATs, and which operates as a PHY transceiver interface to conduct and process signaling between one or more processors 306 of the BS 108 and the antennas 302 to facilitate various types of wireless communication. The antennas 302 can be arranged in one or more arrays of multiple antennas configured similar to or different from each other and can be tuned to one or more frequency bands associated with a corresponding RAT. The one or more processors 306 can include, for example, one or more CPUs, GPUs, TPUs or other ASICs, and the like. The BS 108 further includes one or more computer-readable media 308 that include any of a variety of media used by electronic devices to store data and/or executable instructions, such as RAM, ROM, caches, Flash memory, SSD or other mass-storage devices, and the like. As with the memory 208 of the UE 110, for ease of illustration and brevity, the computer-readable media 308 is referred to herein as "memory 308" in view of frequent use of system memory or other memory to store data and instructions for execution by the processor 306, but it will be understood that reference to "memory 308" shall apply equally to other types of storage media unless otherwise noted.

In at least one embodiment, the BS 108 further includes a plurality of sensors, referred to herein as a sensor set 310, at least some of which are utilized in the neural-network-based schemes of one or more embodiments. Generally, the sensors of the sensor set 310 include those sensors that sense some aspect of the environment of the BS 108 and which have the potential to sense a parameter that has at least some impact on or reflects an RF propagation path of or RF transmission/reception performance by, the BS 108 relative to the corresponding UE 110. The sensors of the sensor set 310 can include one or more sensors for object detection, such as radar sensors, lidar sensors, imaging sensors, structured-light-based depth sensors, and the like. In the event that the BS 108 is a mobile BS, the sensor set 310 also can include one or more sensors for determining a position or pose/orientation of the BS 108. Other examples of types of sensors of the sensor set 310 can include imaging sensors, light sensors for detecting objects in proximity to a feature of the BS 108, and the like.

The one or more memories 308 of the BS 108 store one or more sets of executable software instructions and associated data that manipulate the one or more processors 306 and other components of the BS 108 to perform the various functions of one or more embodiments and attributed to the BS 108. The sets of executable software instructions include, for example, an OS and various drivers (not shown) and various software applications. The sets of executable software instructions further include one or more of a neural network management module 314, a reference signal management module 316, a UE positioning management module 318, or a capabilities management module 320.

The neural network management module 314 implements one or more neural networks for the BS 108, as described in detail below. The reference signal management module 316 manages the generation and transmission of one or more reference signals, which, in some embodiments, is based on one or more neural networks implemented by the neural network management module 314. The UE positioning management module 318 manages the generation of UE position estimates, which, in some embodiments, is based on one or more neural networks implemented by the neural network management module 314. The capabilities management module 320 determines various capabilities of the BS 108 that may pertain to neural network configuration or selection and reports such capabilities to the managing component 150, as well as monitors the BS 108 for changes in such capabilities, including changes in RF and processing capabilities, and the like, and manages the reporting of such capabilities, and changes in the capabilities, to the managing component 150.

To facilitate the operations of the BS 108, the one or more memories 308 of the BS 108 further can store data associated with these operations. This data can include, for example, BS data 322 and one or more neural network architecture configurations 324. The BS data 322 represents, for example, beamforming codebooks, software application configuration information, and the like. The BS data 322 further can include capability information for the BS 108, such as sensor capability information regarding the one or more sensors of the sensor set 310, including the presence or absence of a particular sensor or sensor type, and, for those sensors present, one or more representations of their corresponding capabilities, such as range and resolution for lidar or radar sensors, image resolution and color depth for imaging cameras, and the like. The one or more neural network architecture configurations 324 represent BS-implemented examples selected from the set 412 of candidate neural network architectural configurations 414 maintained by the managing component 150. Thus, as with the neural network architectural configurations 224 of FIG. 2, each neural network architecture configuration 324 includes one or more data structures containing data and other information representative of a corresponding architecture and/or parameter configurations used by the neural network management module 314 to form a corresponding neural network of the BS 108.

FIG. 4 illustrates an example hardware configuration for the managing component 150 in accordance with some embodiments. Note that the depicted hardware configuration represents the processing components and communication components most directly related to the neural-network-based processes of one or more embodiments and omit certain components well-understood to be frequently implemented in such electronic devices. Further, although the hardware configuration is depicted as being located at a single component, the functionality, and thus the hardware components, of the managing component 150 instead may be distributed across multiple infrastructure components or nodes and may be distributed in a manner to perform the functions of one or more embodiments.

As noted above, any of a variety of components, or a combination of components, within the network infrastructure 106 can implement the managing component 150. For ease of illustration, the managing component 150 is described with reference to an example implementation as a server or other component in one of the core networks 102, but in other embodiments, the managing component 150 may be implemented as, for example, part of a BS 108.

As shown, the managing component 150 includes one or more network interfaces 402 (e.g., an Ethernet interface) to couple to one or more networks of the system 100, one or more processors 404 coupled to the one or more network interfaces 402, and one or more non-transitory computer-readable storage media 406 (referred to herein as a "memory 406" for brevity) coupled to the one or more processors 404. The one or more memories 406 stores one or more sets of executable software instructions and associated data that manipulate the one or more processors 404 and other components of the managing component 150 to perform the various functions of one or more embodiments and attributed to the managing component 150. The sets of executable software instructions include, for example, an OS and various drivers (not shown). The software stored in the one or more memories 406 further can include one or more of a training module 408 or a neural network selection module 410. The training module 408 operates to manage the joint training of candidate neural network architectural configurations 414 for the set 412 of candidate neural networks available to be employed at the transmitting and receiving devices in a UE positioning path using one or more sets of training data 416. The training can include training neural networks while offline (that is, while not actively engaged in processing the communications) and/or online (that is, while actively engaged in processing the communications). Moreover, the training may be individual or separate, such that each neural network is individually trained on its own training data set without the result being communicated to, or otherwise influencing, the DNN training at the opposite end of the transmission path or the training may be joint training, such that the neural networks in a data stream transmission path are jointly trained on the same, or complementary, data sets.

The neural network selection module 410 operates to obtain, filter, and otherwise process selection-relevant information 418 from one or both of a BS 108 and a UE 110 in the RAT-assisted UE positioning path and using this selection-relevant information 418 select a pair of jointly trained neural network architectural configurations 414 from a candidate set 412 for implementation at the transmitting device and the receiving device in the RAT-assisted UE positioning path. As noted above, this selection-relevant information 418 can include, for example, one or more of BS capability information 420 or UE capability information 422, current propagation path information, channel-specific parameters, and the like. After the neural network selection module 410 has made a selection, the neural network selection module 410 then initiates the transmission of an indication of the neural network architectural configuration 414 selected for each network component, such as via transmission of an index number associated with the selected configuration, transmission of one or more data structures representative of the neural network architectural configuration itself, or a combination thereof.

Figure 5:
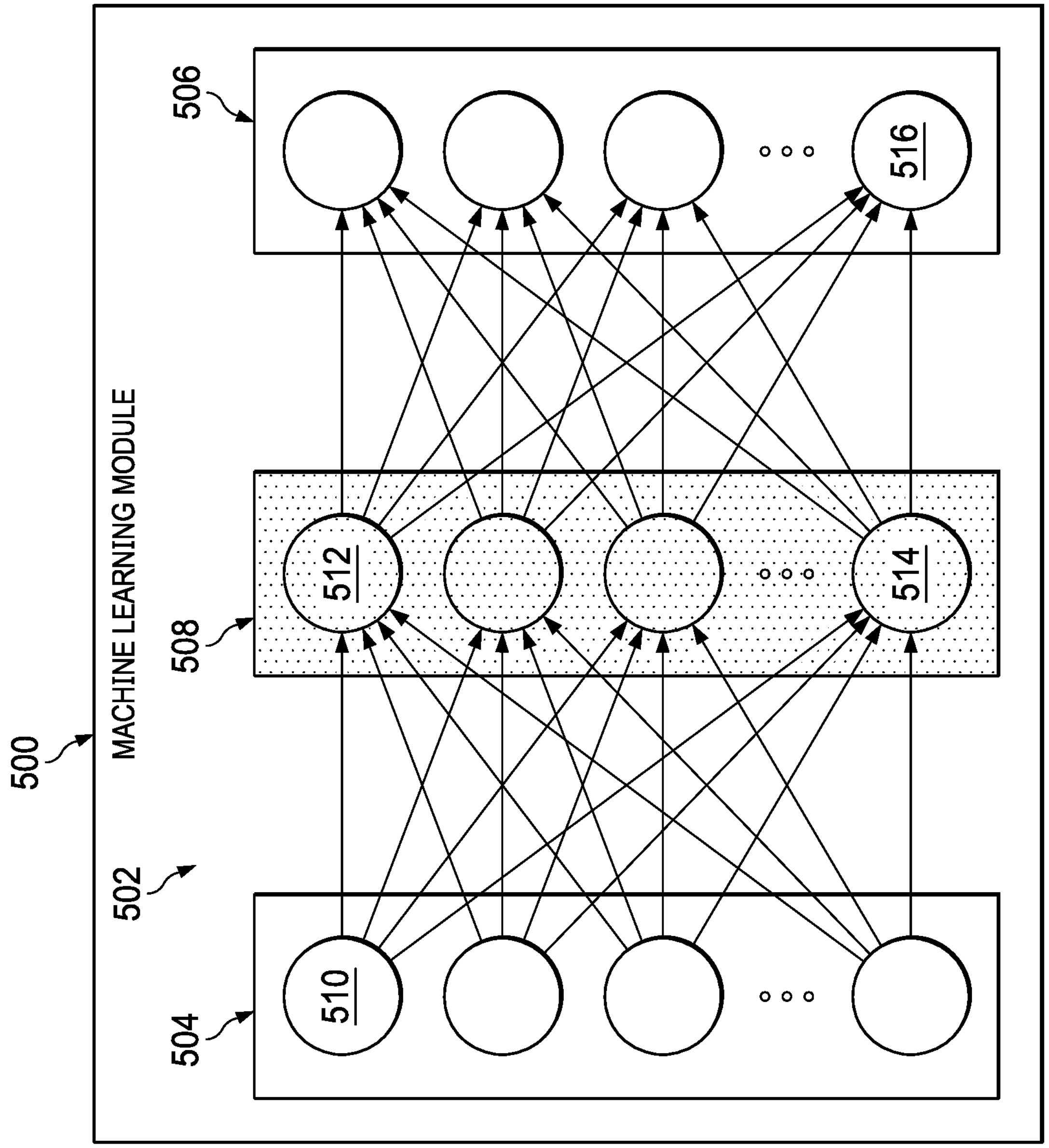
FIG. 5 is a diagram illustrating a machine learning (ML) module employing a neural network for use in a UE positioning neural network architecture in accordance with some embodiments.

FIG. 5 illustrates an example machine learning (ML) module 500 for implementing a neural network in accordance with some embodiments. At least one BS 108 and UE 110 in a UE positioning path 116 implement one or more DNNs or other neural networks for one or more of transmitting reference signals, performing measurements on reference signals, fusing reference signal measurements with UE sensor data, generating UE measurement and sensor reports, and generating UE positioning estimates. The ML module 500, therefore, illustrates an example module for implementing one or more of these neural networks.

In the depicted example, the ML module 500 implements at least one deep neural network (DNN) 502 with groups of connected nodes (e.g., neurons and/or perceptrons) organized into three or more layers. The nodes between layers are configurable in a variety of ways, such as a partially-connected configuration where a first subset of nodes in a first layer is connected with a second subset of nodes in a second layer, a fully-connected configuration where each node in a first layer is connected to each node in a second layer, etc. A neuron processes input data to produce a continuous output value, such as any real number between 0 and 1. In some cases, the output value indicates how close the input data is to a desired category. A perceptron performs linear classifications on the input data, such as a binary classification. The nodes, whether neurons or perceptrons, can use a variety of algorithms to generate output information based upon adaptive learning. Using the DNN 502, the ML module 500 performs a variety of different types of analysis, including single linear regression, multiple linear regression, logistic regression, step-wise regression, binary classification, multiclass classification, multivariate adaptive regression splines, locally estimated scatterplot smoothing, and so forth.

In some implementations, the ML module 500 adaptively learns based on supervised learning. In supervised learning, the ML module 500 receives various types of input data as training data. The ML module 500 processes the training data to learn how to map the input to a desired output. As one example, the ML module 500, when implemented in a BS position reference signal TX mode, receives one or more of reference signals, such as a PRS, capability information of BSs 108, capability information of UEs 110, operating environment characteristics of the BSs 108, operating environment characteristics of the UEs 110, and the like as input and learns how to map this input training data to one or more configured output reference signals for transmission to a UE 110. As another example, the ML module 500, when implemented in a UE position reference signal RX mode, receives one or more of representations of received reference signals, UE reference signal measurements, UE sensor data, and the like as input and learns how to map this input training data to an output representing a UE measurement and sensor report that fuses UE sensor data with UE reference signal measurements. In another example, the ML module 500, when implemented in a UE position feedback TX mode, receives an outgoing UE measurement and sensor report as input and learns how to generate an output that is, for example, at least channel-encoded and suitable for wireless transmission by an RF antenna interface. As yet another example, the ML module 500, when implemented in a BS position RX mode, receives one or more of UE measurement and sensor reports, including UE sensor data and UE reference signal measurements, BS location information, UE location information, and the like as input and learns how to generate an output representing a position estimate of at least one UE. In at least some embodiments, a training process trains the ML module 500 to minimize the mean square error (MSE) of the estimated UE position with the actual position of the UE. Also, the training in either or both of the TX mode or the RX mode further can include training using sensor data as input, capability information as input, RF antenna configuration, or other operational parameter information as input, and the like.

During a training procedure, the ML module 500 uses labeled or known data as an input to the DNN 502. The DNN 502 analyzes the input using the nodes and generates a corresponding output. The ML module 500 compares the corresponding output to truth data and adapts the algorithms implemented by the nodes to improve the accuracy of the output data. Afterward, the DNN 502 applies the adapted algorithms to unlabeled input data to generate corresponding output data. The ML module 500 uses one or both of statistical analysis and adaptive learning to map an input to an output. For instance, the ML module 500 uses characteristics learned from training data to correlate an unknown input to an output that is statistically likely within a threshold range or value. This allows the ML module 500 to receive complex input and identify a corresponding output. In some implementations, a training process trains the ML module 500 on characteristics of communications transmitted over a wireless communication system (e.g., time/frequency interleaving, time/frequency deinterleaving, convolutional encoding, convolutional decoding, power levels, channel equalization, inter-symbol interference, quadrature amplitude modulation/demodulation, frequency-division multiplexing/de-multiplexing, transmission channel characteristics) concurrent with characteristics of data encoding/ decoding schemes employed in such systems. This allows the trained ML module 500 to receive samples of a signal as an input and recover information from the signal, such as the binary data embedded in the signal.

In the depicted example, the DNN 502 includes an input layer 504, an output layer 506, and one or more hidden layers 508 positioned between the input layer 504 and the output layer 506. Each layer has an arbitrary number of nodes, where the number of nodes between layers can be the same or different. That is, the input layer 504 can have the same number and/or a different number of nodes as output layer 506, the output layer 506 can have the same number and/or a different number of nodes than the one or more hidden layer 508, and so forth.

Node 510 corresponds to one of several nodes included in input layer 504, wherein the nodes perform separate, independent computations. As further described, a node receives input data and processes the input data using one or more algorithms to produce output data. Typically, the algorithms include weights and/or coefficients that change based on adaptive learning. Thus, the weights and/or coefficients reflect information learned by the neural network. Each node can, in some cases, determine whether to pass the processed input data to one or more next nodes. To illustrate, after processing input data, node 510 can determine whether to pass the processed input data to one or both of node 512 and node 514 of hidden layer 508. Alternatively or additionally, node 510 passes the processed input data to nodes based upon a layer connection architecture. This process can repeat throughout multiple layers until the DNN 502 generates an output using the nodes (e.g., node 516) of output layer 506.

A neural network can also employ a variety of architectures that determine what nodes within the neural network are connected, how data is advanced and/or retained in the neural network, what weights and coefficients the neural network is to use for processing the input data, how the data is processed, and so forth. These various factors collectively describe a neural network architecture configuration, such as the neural network architecture configurations briefly described above. To illustrate, a recurrent neural network, such as a long short-term memory (LSTM) neural network, forms cycles between node connections to retain information from a previous portion of an input data sequence. The recurrent neural network then uses the retained information for a subsequent portion of the input data sequence. As another example, a feed-forward neural network passes information to forward connections without forming cycles to retain information. While described in the context of node connections, it is to be appreciated that a neural network architecture configuration can include a variety of parameter configurations that influence how the DNN 502 or other neural network processes input data.

A neural network architecture configuration of a neural network can be characterized by various architecture and/or parameter configurations. To illustrate, consider an example in which the DNN 502 implements a convolutional neural network (CNN). Generally, a convolutional neural network corresponds to a type of DNN in which the layers process data using convolutional operations to filter the input data. Accordingly, the CNN architecture configuration can be characterized by, for example, pooling parameter(s), kernel parameter(s), weights, and/or layer parameter(s).

A pooling parameter corresponds to a parameter that specifies pooling layers within the convolutional neural network that reduce the dimensions of the input data. To illustrate, a pooling layer can combine the output of nodes at a first layer into a node input at a second layer. Alternatively or additionally, the pooling parameter specifies how and where in the layers of data processing the neural network pools data. A pooling parameter that indicates "max pooling," for instance, configures the neural network to pool by selecting a maximum value from the grouping of data generated by the nodes of a first layer and use the maximum value as the input into the single node of a second layer. A pooling parameter that indicates "average pooling" configures the neural network to generate an average value from the grouping of data generated by the nodes of the first layer and uses the average value as the input to the single node of the second layer.

A kernel parameter indicates a filter size (e.g., a width and a height) to use in processing input data. Alternatively or additionally, the kernel parameter specifies a type of kernel method used in filtering and processing the input data. A support vector machine, for instance, corresponds to a kernel method that uses regression analysis to identify and/or classify data. Other types of kernel methods include Gaussian processes, canonical correlation analysis, spectral clustering methods, and so forth. Accordingly, the kernel parameter can indicate a filter size and/or a type of kernel method to apply in the neural network. Weight parameters specify weights and biases used by the algorithms within the nodes to classify input data. In some implementations, the weights and biases are learned parameter configurations, such as parameter configurations generated from training data. A layer parameter specifies layer connections and/or layer types, such as a fully-connected layer type that indicates to connect every node in a first layer (e.g., output layer 506) to every node in a second layer (e.g., hidden layer 508), a partially-connected layer type that indicates which nodes in the first layer to disconnect from the second layer, an activation layer type that indicates which filters and/or layers to activate within the neural network, and so forth. Alternatively or additionally, the layer parameter specifies types of node layers, such as a normalization layer type, a convolutional layer type, a pooling layer type, and the like.

While described in the context of pooling parameters, kernel parameters, weight parameters, and layer parameters, it will be appreciated that other parameter configurations can be used to form a DNN consistent with the guidelines provided herein. Accordingly, a neural network architecture configuration can include any suitable type of configuration parameter that a DNN can apply that influences how the DNN processes input data to generate output data.

The architectural configuration of the ML module 500 may be based on capabilities (including sensors) of the node implementing the ML module 500, of one or more nodes upstream or downstream of the node implementing the ML module 500, or a combination thereof. For example, the UE 110 may have one or more sensors enabled or disabled or may be battery power limited, and thus the ML modules 500 for both the UE 110 and the BS 108 may be trained based on different sensor configurations of a UE 110 or battery power as an input to facilitate, for example, the ML modules 500 at both ends to employ RAT-assisted UE positioning techniques that are better suited to different sensor configurations of a UE 110 or lower power consumption.

Accordingly, in some embodiments, the device implementing the ML module 500 may be configured to implement different neural network architecture configurations for different combinations of capability parameters, sensor parameters, RF environment parameters, operational parameters, and the like. For example, a device may have access to one or more neural network architectural configurations for use when an imaging camera is available for use at the UE 110, and a different set of one or more neural network architectural configurations for use when the imaging camera is unavailable at the UE 110.

In at least some embodiments, the device implementing the ML module 500 locally stores some or all of a set of candidate neural network architectural configurations that the ML module 500 can employ. For example, a component may index the candidate neural network architectural configurations by a look-up table (LUT) or other data structure that takes as inputs one or more parameters, such as one or more BS capability parameters, one or more UE capability parameters, one or more BS operating parameters, one or more UE operating parameters, one or more channel parameters, and the like, and outputs an identifier associated with a corresponding locally-stored candidate neural network architectural configuration that is suited for operation in view of the input parameter(s). However, in some embodiments, the neural network employed at the BS 108 and the neural network employed at the UE 110 are jointly trained, and thus a mechanism may need to be employed between the BS 108 and the UE 110 to help ensure that each device selects for its ML module 500 a neural network architectural configuration that has been jointly trained with, or at least is operationally compatible with, the neural network architectural configuration the other device has selected for its complementary ML module 500. This mechanism can include, for example, coordinating signaling transmitted between BS 108 and UE 110 directly or via the managing component 150, or the managing component 150 may serve as a referee that selects a compatible jointly trained pair of architectural configurations from a subset proposed by each device.

However, in other embodiments, it may be more efficient or otherwise advantageous to have the managing component 150 operate to select the appropriate jointly trained pair of neural network architectural configurations to be employed at the counterpart ML modules 500 at the transmitting device and receiving device. In this approach, the managing component 150 obtains information representing some or all of the parameters that may be used in the selection process from the transmitting and receiving devices, and from this information selects a jointly trained pair of neural network architectural configurations 414 from the set 412 of such configurations maintained at the managing component 150. The managing component 150 (or other network component) may implement this selection process using, for example, one or more algorithms, a LUT, and the like. The managing component 150 then may transmit to each device either an identifier or other indication of the neural network architectural configuration selected for the ML module 500 of that device (in the event that each device has a locally stored copy), or the managing component 150 may transmit one or more data structures representative of the neural network architectural configuration selected for that device.

To facilitate the process of selecting an appropriate pair of neural network architectural configurations for the transmitting and receiving devices, in at least one embodiment, the managing component 150 trains the ML modules 500 in a UE positioning path using a suitable combination of the neural network management modules and training modules. The training can occur offline when no active communication exchanges are occurring or online during active communication exchanges. For example, the managing component 150 can mathematically generate training data, access files that store the training data, obtain real-world communications data, etc. The managing component 150 then extracts and stores the various learned neural network architecture configurations for subsequent use. Some implementations store input characteristics with each neural network architecture configuration, whereby the input characteristics describe various properties of one or both of BS 108 or UE 110 operating characteristics and capability configuration corresponding to the respective neural network architecture configurations. In implementations, a neural network manager selects a neural network architecture configuration by matching a current operating environment of one or more of the BS 108 or UE 110 to the input characteristics, with the current operating environment including indications of capabilities of one or more nodes along the training UE positioning path, such as sensor capabilities, RF capabilities, processing capabilities, and the like.

As noted, network devices that are in wireless communication, such as BS 108 and the UE 110, can be configured to process wireless communication exchanges using one or more DNNs at each networked device, where each DNN replaces and/or adds new functionality to one or more functions conventionally implemented by one or more hard-coded or fixed-design blocks in furtherance of a RAT-assisted UE positioning process. Moreover, each DNN can further incorporate current sensor data from one or more sensors of a sensor set of the networked device and/or capability data from some or all of the nodes in the UE positioning path 116 to, in effect, modify or otherwise adapt its operation to account for the current operational environment.

Figure 6:
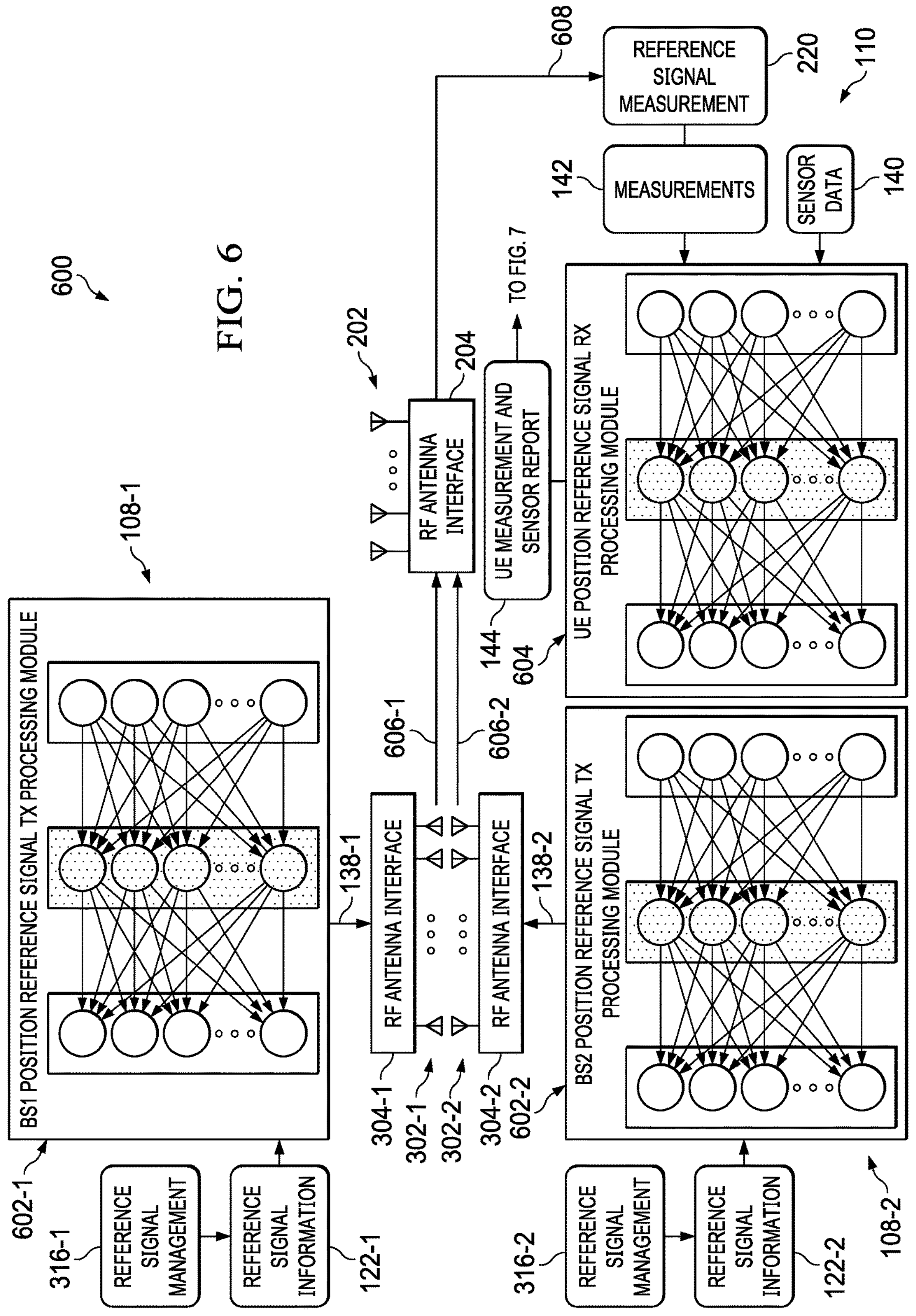
FIG. 6 is a diagram illustrating a pair of jointly-trained neural networks for the processing and transmission of reference signals between one or more BSs and a UE in accordance with some embodiments.
Figure 7:
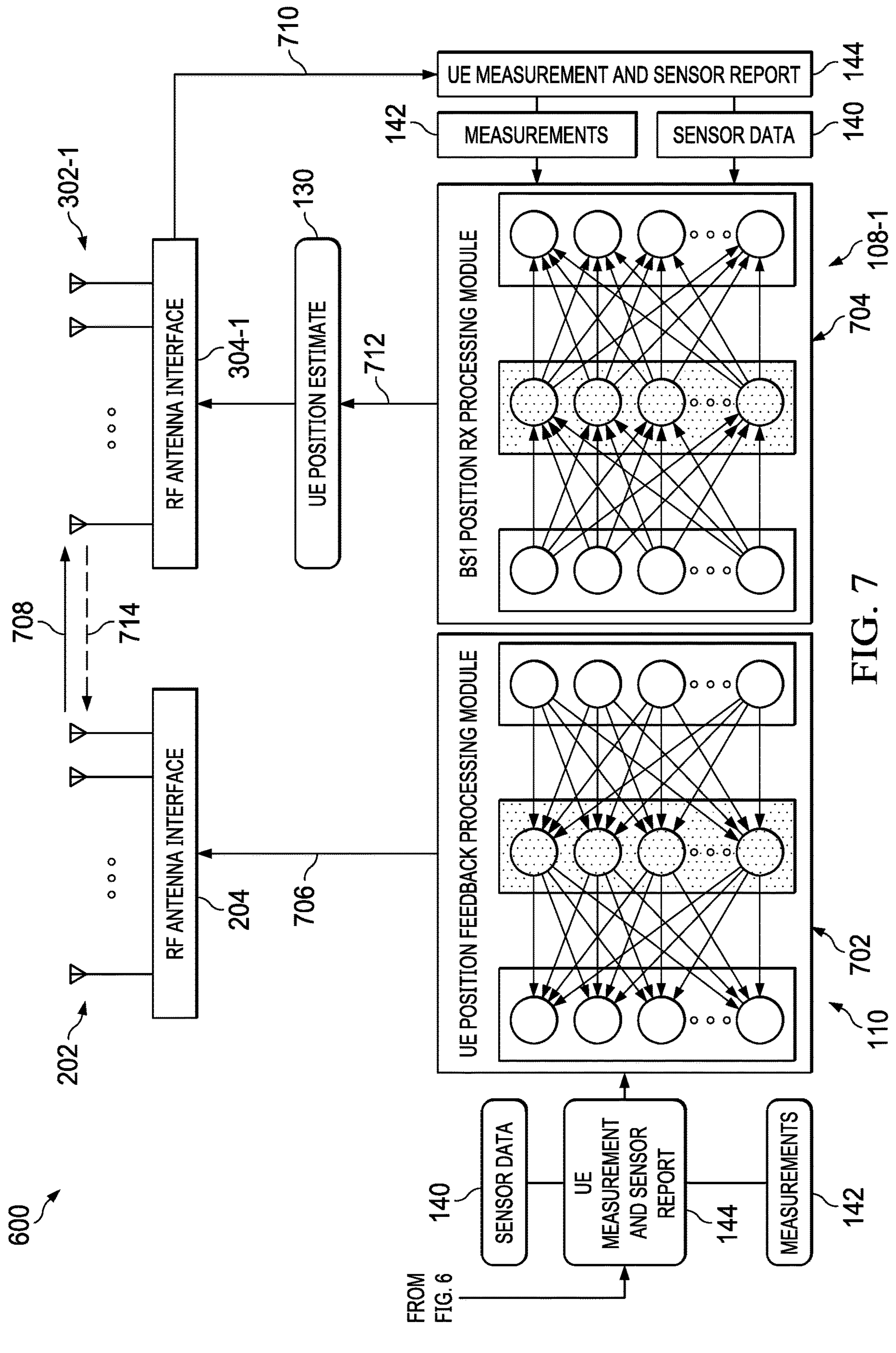
FIG. 7 is a diagram illustrating a pair of jointly-trained neural networks for the processing and transmission of UE measurement and sensor report, including reference signal measurements fused with local UE sensor data, between a UE and a BS in accordance with some embodiments.

To this end, FIG. 6 and FIG. 7 together illustrate an example operating environment 600 for DNN implementation in the example UE positioning path 116 of FIG. 1. In the illustrated example, the operating environment 600 employs a neural-network-based approach for facilitating RAT-assisted UE positioning. In at least one embodiment, the neural network management module 314 of one or more BSs 108 implements a BS position reference signal TX processing module 602 (illustrated as TX processing modules 602-1 and 602-2), while the neural network management module 216 of the UE 110 implements a UE position reference signal receiver (RX) processing module 604. The neural network management module 216 of the UE 110 further implements a UE position feedback TX processing module 702, while the neural network management module 314 of the serving BS 108-1 further implements a BS position RX processing module 704.

In at least one embodiment, each of these processing modules implements one or more DNNs via the implementation of a corresponding ML module, such as described above with reference to the one or more DNNs 502 of the ML module 500 of FIG. 5. As such, the BS position reference signal TX processing module 602 of one or more BSs 108 and the UE position reference signal RX processing module 604 of the UE 110 interoperate to support a downlink neural-network-based wireless communication path between the BS 108 and the UE 110 for generating and communicating data to facilitate RAT-assisted UE positioning. Likewise, the UE position feedback TX processing module 702 of the UE 110 and the BS position RX processing module 704 of the serving BS 108-1 interoperate to support an uplink neural-network-based wireless communication path between the UE 110 and the serving BS 108-1 for generating and communicating data to facilitate RAT-assisted UE positioning.

One or more DNNs of the BS position reference signal TX processing module 602 of at least one BS 108 are trained to receive reference signal information 122 (illustrated as information 122-1 and 122-2) from the BS reference signal management module 316 (illustrated as modules 316-1 and 316-2) as an input. In one example, the BS position reference signal TX processing module 602 receives the reference signal information 122 as input in response to a component, such as the UE 110, location management server (not shown), remote application, and the like, requesting UE position information. The reference signal information 122, in at least some embodiments, includes one or more different types of information that the DNN(s) of the BS position reference signal TX processing module 602 utilizes as input to generate and configure one or more reference signals. Examples of reference signal information 122 include reference signal related parameters or attributes, such as transmission power, antenna mapping, number of physical downlink control channel (PDCCH) symbols, transmission number of consecutive downlink subframes, PRS bandwidth, PRS transmission time offset, PRS configuration index, PRS periodicity, PRS subframe offset, PRS muting sequence, PRS muting sequence length, time-domain behavior, time/frequency resource element density, quasi co-location (QCL) information, RX panel information of the UE 110, and so on. Other examples of reference signal information 122 include the serving cell's operating characteristics (e.g., frequency, bandwidth, etc.), UE reported reference signal received power (RSRP), doppler estimate, deployment information (e.g., urban/rural deployment or whether angular estimation is to be performed by the BS 108), UE capability information, and the like.

From the reference signal information 122 input, the one or more DNNs of the BS position reference signal TX processing module 602 are trained to generate and configure one or more corresponding reference signal 138 outputs (illustrated as outputs 138-1 and 138-2), such as a PRS output. For example, the BS position reference signal TX processing module 602 generates and configures the reference signal 138 to include specific parameters or characteristics (e.g., bandwidth, resource or resource sets, repetition, periodicity, interference suppression, and the like) based on the reference signal information 122 input. The RF antenna interface 304 (illustrated as interfaces 304-1 and 304-2) and one or more antennas 302 (illustrated as antennas 302-1 and 302-2) of the BS 108 convert the reference signal 138 output into a corresponding RF signal 606 (illustrated as RF signals 606-1 and 606-2) that is wirelessly transmitted for reception by the UE 110. In particular, in some embodiments, the one or more DNNs of the BS position reference signal TX processing module 602 are trained to provide processing that, in effect, results in a configured and modulated reference signal for transmission by the BS 108 to the UE 110, with such processing being trained into the one or more DNNs via joint training rather than requiring laborious and inefficient hardcoding of algorithms or separate discrete processing blocks to implement the generation, configuration, and modulation of the reference signal.

The RF signal 606 is received and processed at the UE 110 via one or more antennas 202 and the RF antenna interface 204, and the resulting captured signal 608 is analyzed by the reference signal measurement module 220 to generate one or more reference signal measurements 142, such as RSRP, RSTD, OTDoA, UTDoA, TDAV, AoA, AoD, RTT, and the like. One or more DNNs of the UE position reference signal RX processing module 604 of the UE 110 are trained to receive the reference signal measurements 142 as input, as well as other inputs, and from these inputs generate a corresponding UE measurement and sensor report 144 output. In at least some embodiments, the UE position reference signal RX processing module 604 does not receive the other inputs, and as a result, the UE position reference signal RX processing module 604 generates a UE measurement report (rather than a UE measurement and sensor report). Also, the UE position reference signal RX processing module 604 can receive the captured signal 608 signal as an input and calculate reference signal measurements 142 thereon, compared to receiving the reference signal measurements 142 from the reference signal measurement module 220.

The other inputs provided to the UE position reference signal RX processing module 604 can include, for example, sensor data 140 from the sensor set 210. Examples of sensor data 140 input include GPS data, camera data, accelerometer data, IMU data, altimeter data, temperature data, barometer data, object detection data (e.g., radar data, lidar data, imaging sensor data, structured-light-based depth sensor data, etc.), and the like. Further, it will be appreciated that the capabilities of the UE 110, including available sensors, may change from moment to moment. For example, the UE 110 may disable one or more sensors based on the current battery level, thermal state, or other condition of the UE 110. To compensate for varying sensor capabilities, the one or more DNNs of the RX processing module 604 may be trained on different sensor data 140 inputs to provide UE measurement and sensor report 144 outputs that take into consideration different sensor capabilities of the UE 110. As such, in some embodiments, the one or more DNNs of the UE position reference signal RX processing module 604 are trained to provide processing that, in effect, results in UE measurement and sensor reports 144 that fuse sensor data 140 from available sensors of a UE 110 with UE reference signal measurements 142, with such processing being trained into the one or more DNNs via joint training rather than requiring laborious and inefficient hardcoding of algorithms or separate discrete processing blocks to implement the same process.

As depicted in the example shown in FIG. 7, the UE position reference signal RX processing module 604 provides the UE measurement and sensor report 144 output to the UE position feedback TX processing module 702 of the UE 110 as input, and from this input generates a corresponding output signal 706 representing the UE measurement and sensor report 144. The RF antenna interface 204 and one or more antennas 202 convert the output signal 706 into a corresponding RF signal 708 representing a wireless communication that is wirelessly transmitted for reception by the serving BS 108-1. The UE 110 can use various messaging mechanisms, such as the Radio Resource Control (RRC) protocol, Long Term Evolution (LTE) Positioning Protocol (LPP), and the like, for configuring and transmitting the wireless communication. In particular, in some embodiments, the one or more DNNs of the UE position feedback TX processing module 702 are trained to provide processing that, in effect, results in, for example, at least a channel-encoded (including modulated) representation of the input UE measurement and sensor report 144 suitable for wireless transmission by the RF antenna interface 204, with such processing being trained into the one or more DNNs via joint training rather than requiring laborious and inefficient hardcoding of algorithms or separate discrete processing blocks to implement the same process.

The RF signal 708 propagated from the UE 110 is received and initially processed by the antenna 302-1 and RF antenna interface 304-1 of the serving BS 108-1 to, for example, convert the RF signal 708 to a digital signal representing the UE measurement and sensor report 144. The one or more DNNs of the BS position RX processing module 704 are trained to receive the resulting output 710 of the RF antenna interface 304 representing the UE measurement and sensor report 144 as an input, and from this input, generate a corresponding UE position estimate 130. For example, the one or more DNNs of the BS position RX processing module 704 receive as input the UE position estimate 130, including the UE reference signal measurement(s) 142 and, in some embodiments, UE sensor data 140. From these inputs, the one or more DNNs of the BS position RX processing module 704 generate an output 712 representative of a position estimate 130 for the UE 110. The UE position estimate 130, in at least some embodiments, not only incorporates the reference signal measurement(s) 142 provided by the UE 110 but also incorporates the UE sensor data 140, resulting in a UE position estimate 130 that includes, for example, a geographical location of the UE 110, a local circumstance of the UE 110, an indication of the UE orientation, second-order information, such as movement (e.g., rotation, heading, etc.), and the like. In particular, in some embodiments, the one or more DNNs of the BS position RX processing module 704 are trained to provide processing that, in effect, results in an output representative of a UE position estimate 130 that is based on, for example, UE reference signal measurements 142 fused with UE sensor data 140, with such processing being trained into the one or more DNNs via joint training rather than requiring laborious and inefficient hardcoding of algorithms or separate discrete processing blocks to implement the same process. As such, by considering the UE sensor data 140 in addition to UE reference signal measurements 142, the BS position RX processing module 704 can generate more accurate and meaningful UE position estimates than conventional RAT-assisted positioning techniques.

In at least some embodiments, the serving BS 108-1 processes the UE position estimate 130 or transmits the UE position estimate 130 to one or more other components of the wireless communications system 100, such as the UE 110 or a location management function (LMF) server (not shown), for further processing. The UE position estimate 130 can be transmitted in various standard or non-standard formats and include additional information such as estimated errors (uncertainty), methods used to obtain the UE position estimate, and the like. If the serving BS 108-1 transmits the UE position estimate 130 to one or more other components, the RF antenna interface 304 and one or more antennas 302-1 of the serving BS 108-1 convert the output 712 representative of the position estimate 130 into a corresponding RF signal 714 that is wirelessly transmitted for reception by UE 110 (or other network component). In at least some embodiments, the serving BS 108-1 implements a UE position estimate TX processing module (not shown) having one or more DNNs that are trained to provide processing that, in effect, results in a data encoded (e.g., compressed) and/or channel encoded representation of the UE position estimate 130 suitable for wireless transmission by the RF antenna interface 304, with such processing being trained into the one or more DNNs via joint training.

Figure 8:
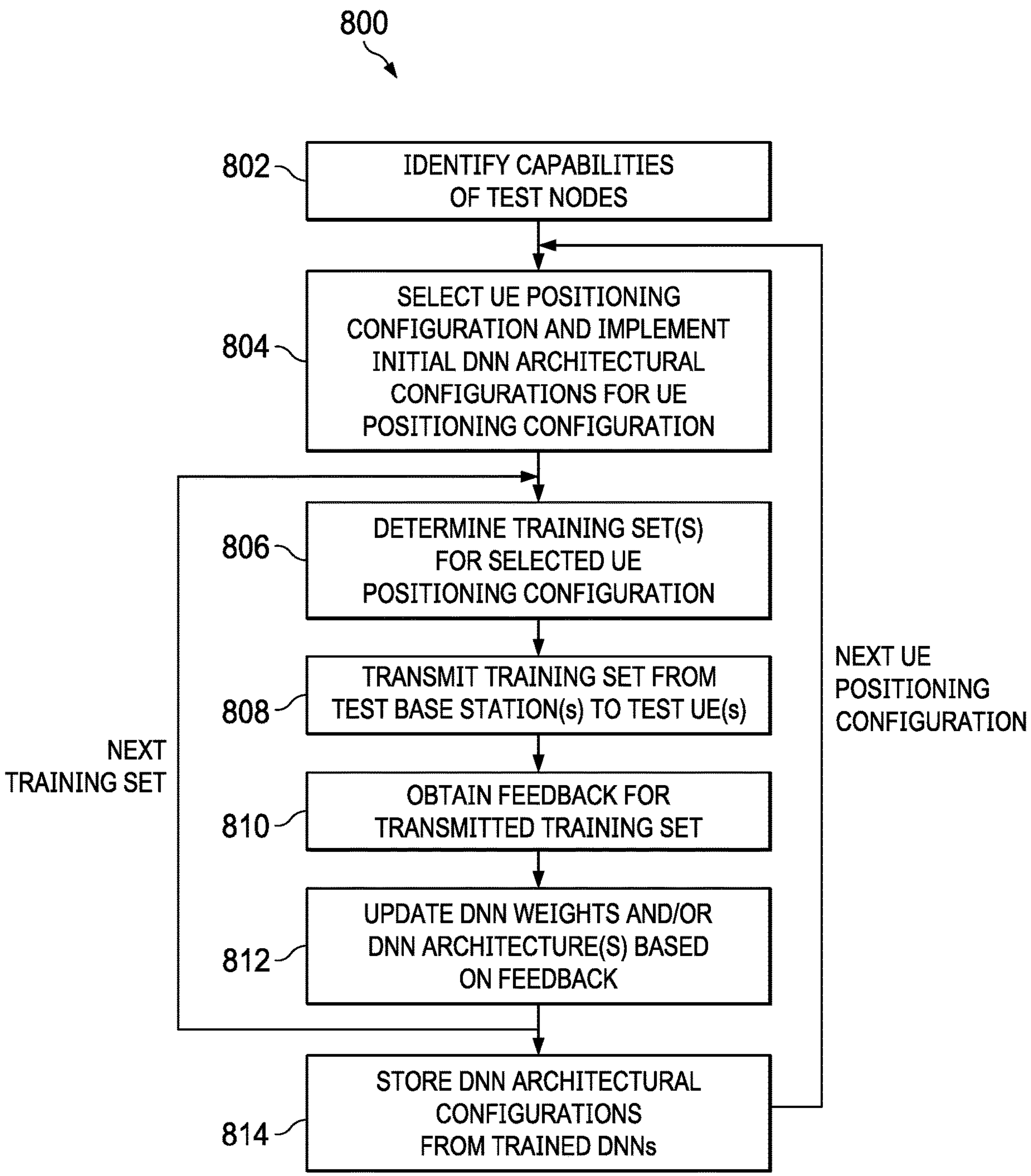
FIG. 8 is a flow diagram illustrating an example method for joint training of a set of neural networks for facilitating UE positioning in a wireless system in accordance with some embodiments.

DNNs or other neural networks for implementing a RAT-assisted UE positioning path between a BS 108 and a UE 110 provide flexibility in design and facilitate efficient updates relative to conventional per-block design and test approaches while also allowing the devices in the UE positioning path to quickly adapt their generation, transmission, and processing of reference signals, UE measurement and sensor reports, and UE position estimates based on current operational parameters and capabilities. However, before the DNNs can be deployed and put into operation, they typically are trained or otherwise configured to provide suitable outputs for a given set of one or more inputs. To this end, FIG. 8 illustrates an example method 800 for developing one or more jointly trained DNN architectural configurations as options for the devices in a RAT-assisted UE positioning path for different operating environments or capabilities in accordance with some embodiments. Note that the order of operations described with reference to FIG. 8 is for illustrative purposes only, and that a different order of operations may be performed, and further that one or more operations may be omitted or one or more additional operations included in the illustrated method. Further note that while FIG. 8 illustrates an offline training approach using one or more test nodes, a similar approach may be implemented for online training using one or more nodes that are in active operation.

As explained above, the operations of DNNs employed at one or both devices in the DNN chain forming a corresponding RAT-assisted UE positioning path may be based on particular capabilities and current operational parameters of the RAT-assisted UE positioning path, such as the operational parameters and/or capabilities of the device employing the corresponding DNN, of one or more upstream or downstream devices, or a combination thereof. These capabilities and operational parameters can include, for example, the types of sensors used to sense a current circumstance of a device, the capabilities of such sensors, the power capacity of one or more devices, the processing capacity of the one or more devices, the RF antenna interface configurations (e.g., number of beams, antenna ports, frequencies supported) of the one or more devices, and the like. Because the described DNNs utilize such information to dictate their operations, it will be appreciated that in many instances the particular DNN configuration implemented at one of the nodes is based on particular capabilities and operational parameters currently employed at that device or at the device on the opposite side of the RAT-assisted UE positioning path; that is, the particular DNN configuration implemented is reflective of capability information and operational parameters currently exhibited by the RAT-assisted UE positioning path implemented by the BS 108 and the UE 110.

Accordingly, the method 800 initiates at block 802 with the identification of the anticipated capabilities (including anticipated operational parameters or parameter ranges) of one or more test nodes of a test RAT-assisted UE positioning path, which would include one or more test BSs and one or more test UEs (also referred to as "test devices" for brevity). For the following, it is assumed that a training module 408 of the managing component 150 is managing the joint training, and thus the capability information for the test devices is known to the training module 408 (e.g., via a database or other locally stored data structure storing this information). However, because the managing component 150 likely does not have a priori knowledge of the capabilities of any given UE, the test UE provides the managing component 150 with an indication of its capabilities, such as an indication of the types of sensors available at the test UE, an indication of various parameters for these sensors (e.g., imaging resolution and picture data format for an imaging camera, satellite-positioning type and format for a satellite-based position sensor, etc.), accessories available at the device and applicable parameters (e.g., number of audio channels), and the like. For example, the test UE can provide this indication of capabilities as part of a UECapabilityInformation Radio Resource Control (RRC) message typically provided by UEs in response to a UECapabilityEnquiry RRC message transmitted by a BS in accordance with at least the 4G LTE and 5G NR specifications. Alternatively, the test UE can provide the indication of sensor capabilities as a separate side-channel or control-channel communication. Further, in some embodiments, the capabilities of test devices may be stored in a local or remote database available to the managing component 150, and thus the managing component 150 can query this database based on some form of an identifier of the test device, such as an International Mobile Subscriber Identity (IMSI) value associated with the test device.

In at least some embodiments, the training module 408 may attempt to train every RAT-assisted UE positioning configuration (or "UE positioning configuration" for brevity) permutation. However, in implementations in which the BSs 108 and UEs 110 are likely to have a relatively large number and variety of capabilities and other operational parameters, this effort may be impracticable. Accordingly, at block 804 the training module 408 can select a particular UE positioning configuration for which to jointly train the DNNs of the test devices from a specified set of candidate RAT-assisted UE positioning configurations. Each candidate UE positioning configuration thus may represent a particular combination of UE positioning relevant parameters, parameter ranges, or combinations thereof. Such parameters or parameter ranges can include sensor capability parameters, processing capability parameters, battery power parameters, RF-signaling parameters, such as number and types of antennas, number and types of subchannels, etc., and the like. Such UE positioning relevant parameters further can represent the particular type of reference signals to be used by the BS 108, the manner in which the UE 110 is to perform reference signal measurements, the types of sensor data to be fused with reference signal measurements, and the like. With a candidate UE positioning configuration selected for training, further at block 804 the training module 408 identifies an initial DNN architectural configuration for each of the test BS and test UE and directs the test devices to implement these respective initial DNN architectural configurations, either by providing an identifier associated with the initial DNN architectural configuration to the test device in instances where the test device stores copies of the candidate initial DNN architectural configurations, or by transmitting data representative of the initial DNN architectural configuration itself to the test device.

With a UE positioning configuration selected and the test devices initialized with DNN architectural configurations based on the selected UE positioning configuration, at block 806 the training module 408 identifies one or more sets of training data for use in jointly training the DNNs of the DNN chain based on the selected UE positioning configuration and initial DNN architectural configurations. That is, the one or more sets of training data include or represent data that could be provided as input to a corresponding DNN in an offline or online operation and thus suitable for training the DNNs. To illustrate, this training data can include a stream of test positioning (or other) reference signals, test received representations of the test positioning (or other) reference signals, test parameters or configurations for test positioning (or other) reference signals, test reference signal measurements, test sensor data consistent with the sensors included in the configuration under test, test UE measurement reports, test UE measurement and sensor reports, test received representations of UE measurement reports, test received representations of UE measurement and sensor reports, test UE position estimates, and the like.

With one or more training sets obtained, at block 808 the training module 408 initiates the joint training of the DNNs of the test UE positioning path. This joint training typically involves initializing the bias weights and coefficients of the various DNNs with initial values, which generally are selected pseudo-randomly, then inputting a set of training data at the TX processing module (e.g., BS position reference signal TX processing module 602) of the test BS device, wirelessly transmitting the resulting output as a transmission to the RX processing module of the test UE device (e.g., the UE position reference signal RX processing module 604), analyzing the resulting output, and then updating the DNN architectural configurations based on the analysis. The joint training can further include inputting a set of training data at the TX processing module (e.g., UE position feedback TX processing module 702) of the test UE device, wirelessly transmitting the resulting output as a transmission to the RX processing module of the test BS device (e.g., the BS position RX processing module 704), analyzing the resulting output, and then updating the DNN architectural configurations based on the analysis. In another example, the joint training includes end-to-end joint training including inputting a set of training data at the TX processing module (e.g., BS position reference signal TX processing module 602) of the test BS device, wirelessly transmitting the resulting output as a transmission to the RX processing module of the test UE device (e.g., the UE position reference signal RX processing module 604), providing the output of the RX processing module of the test UE device as input to the TX processing module (e.g., UE position feedback TX processing module 702) of the test UE device, wirelessly transmitting the resulting output as a transmission to the RX processing module of the test BS device (e.g., the BS position RX processing module 704) analyzing the resulting output, and then updating the DNN architectural configurations based on the analysis. In at least some embodiments, at least one of the DNN architectural configurations of one or more of the test devices are individually trained.

As is frequently employed for DNN training, feedback obtained as a result of the actual result output of one or more of the BS position reference signal TX processing module 602, the UE position reference signal RX processing module 604, the UE position feedback TX processing module 702, or the BS position RX processing module 704 is used to modify or otherwise refine parameters of one or more DNNs of the UE positioning path, such as through backpropagation. Accordingly, at block 810 the managing component 150 and/or the DNN chain obtain feedback for the transmitted training set. Implementation of this feedback can take any of a variety of forms or combinations of forms. In at least some embodiments, the feedback includes the training module 408 or other training module determining an error between the actual result output and the expected result output, and backpropagating this error throughout the DNNs of the DNN chain. For example, as the processing by the DNN chain effectively provides a form of UE position estimation, the objective feedback on the training data set can some form of measurement of the accuracy of UE position estimates obtained as output from the DNN chain compared to, for example, known UE locations, known UE orientations, known UE velocity, and the like.

At block 812, the managing component 150 or DNN chain uses the feedback obtained as a result of the transmission of the test data set through the DNN chain and presentation or other consumption of the resulting output at the test transmitting device is to update various aspects of one or more DNNs of the UE positioning path, such as through backpropagation of the error to change weights, connections, or layers of a corresponding DNN, or through managed modification by the managing component 150 in response to such feedback. The managing component 150 (or other network component) performs the training process of blocks 806 to 812 for the next set of training data selected at the next iteration of block 806 and repeats until a certain number of training iterations have been performed or until a certain minimum error rate has been achieved.

As a result of the joint (or individual) training of the neural networks along the UE positioning path between a test BS device and test UE device, each neural network has a particular neural network architectural configuration, or DNN architectural configuration in instances in which the implemented neural networks are DNNs, that characterizes the architecture and parameters of corresponding DNN, such as the number of hidden layers, the number of nodes at each layer, connections between each layer, the weights, coefficients, and other bias values implemented at each node, and the like. Accordingly, when the joint or individual training of the DNNs of the UE positioning path for a selected UE positioning configuration is complete, at block 814, the managing component 150 (or other network component) distributes some or all of the trained DNN configurations to the BS 108 and UEs 110 in the system 100. Each node stores the resulting DNN configurations of their corresponding DNNs as a DNN architectural configuration. In at least one embodiment, the managing component 150 (or other network component) can generate the DNN architectural configuration by extracting the architecture and parameters of the corresponding DNN, such as the number of hidden layers, number of nodes, connections, coefficients, weights, and other bias values, and the like, at the conclusion of the joint training. In other embodiments, the managing component 150 stores copies of the paired DNN architectural configurations as candidate neural network architectural configurations 414 of the set 412. The managing component 150 (or other network component) then distributes these DNN architectural configurations to the BS 108 and UE 110 on an as-needed basis.

In the event that there are one or more other candidate UE positioning configurations remaining to be trained, then the method 800 returns to block 804 for the selection of the next candidate UE positioning configuration to be jointly trained, and another iteration of the subprocess of blocks 804 to 814 is repeated for the next UE positioning configuration selected by the training module 408. Otherwise, if the DNNs of the UE positioning path have been jointly trained for all intended UE positioning configurations, then method 800 completes and the system 100 can shift to neural-network-supported RAT-assisted UE positioning, as described below with reference to FIGS. 9-12.

As noted above, the managing component 150 (or other network component) can perform the joint training process using offline test nodes (that is, while no active communications of control information or user-plane data are occurring) or while the actual nodes of the intended transmission path are online (that is, while active communications of control information or user-plane data are occurring). Further, in some embodiments, rather than the managing component 150 training all of the DNNs jointly, in some instances, a subset of the DNNs can be trained or retrained while the managing component 150 maintains other DNNs as static. To illustrate, the managing component 150 may detect that the DNN of a particular device is operating inefficiently or incorrectly due to, for example, capability changes in the device implementing the DNN or in response to a previously unreported loss of processing capacity, and thus the managing component 150 may schedule individual retraining of the DNN(s) of the device while maintaining the other DNNs of the other devices in their present configurations.

Further, it will be appreciated that, although there may be a wide variety of devices supporting a large number of UE positioning configurations, many different nodes may support the same or similar UE positioning configuration. Thus, rather than have to repeat the joint training for every device that is incorporated into the UE positioning path, following joint training of a representative device, that device can transmit a representation of its trained DNN architectural configuration for a UE positioning configuration to the managing component 150, and the managing component 150 can store the DNN architectural configuration and subsequently transmit it to other devices that support the same or similar UE positioning configuration for implementation in the DNNs of the UE positioning path.

Moreover, the DNN architectural configurations often will change over time as the corresponding devices operate using the DNNs. Thus, as operation progresses, the neural network management module of a given device (e.g., neural network management modules 216, 314) can be configured to transmit a representation of the updated architectural configurations of one or more of the DNNs employed at that node, such as by providing the updated gradients and related information, to the managing component 150 in response to a trigger. This trigger may be the expiration of a periodic timer, a query from the managing component 150, a determination that the magnitude of the changes has exceeded a specified threshold, and the like. The managing component 150 then incorporates these received DNN updates into the corresponding DNN architectural configuration and, thus, has an updated DNN architectural configuration available for distribution to the nodes in the transmission path as appropriate.

Figure 9:
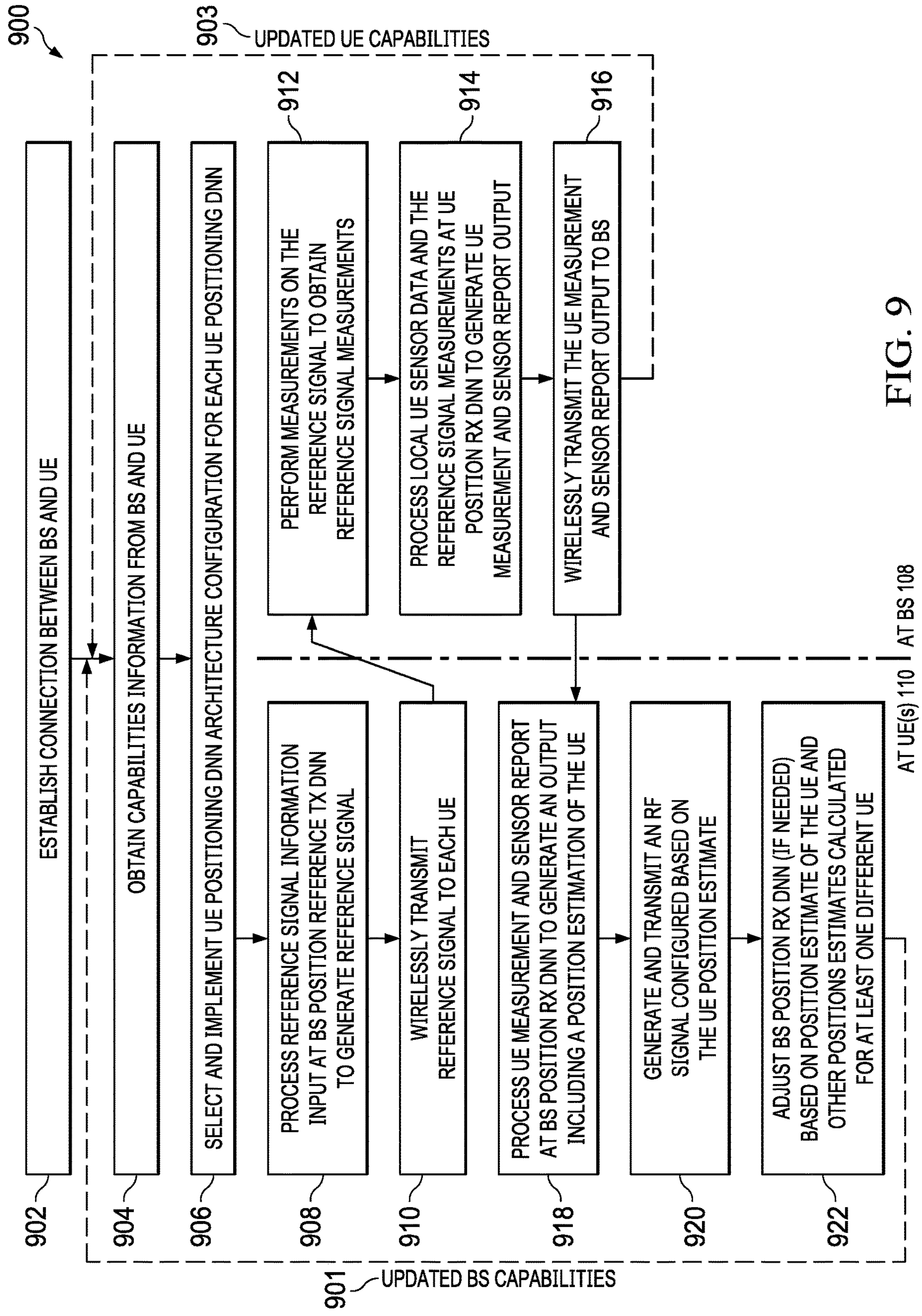
FIG. 9 is a flow diagram illustrating an example method for calculating a UE position estimate using a selected and jointly trained set of neural networks in accordance with some embodiments.
Figure 10:
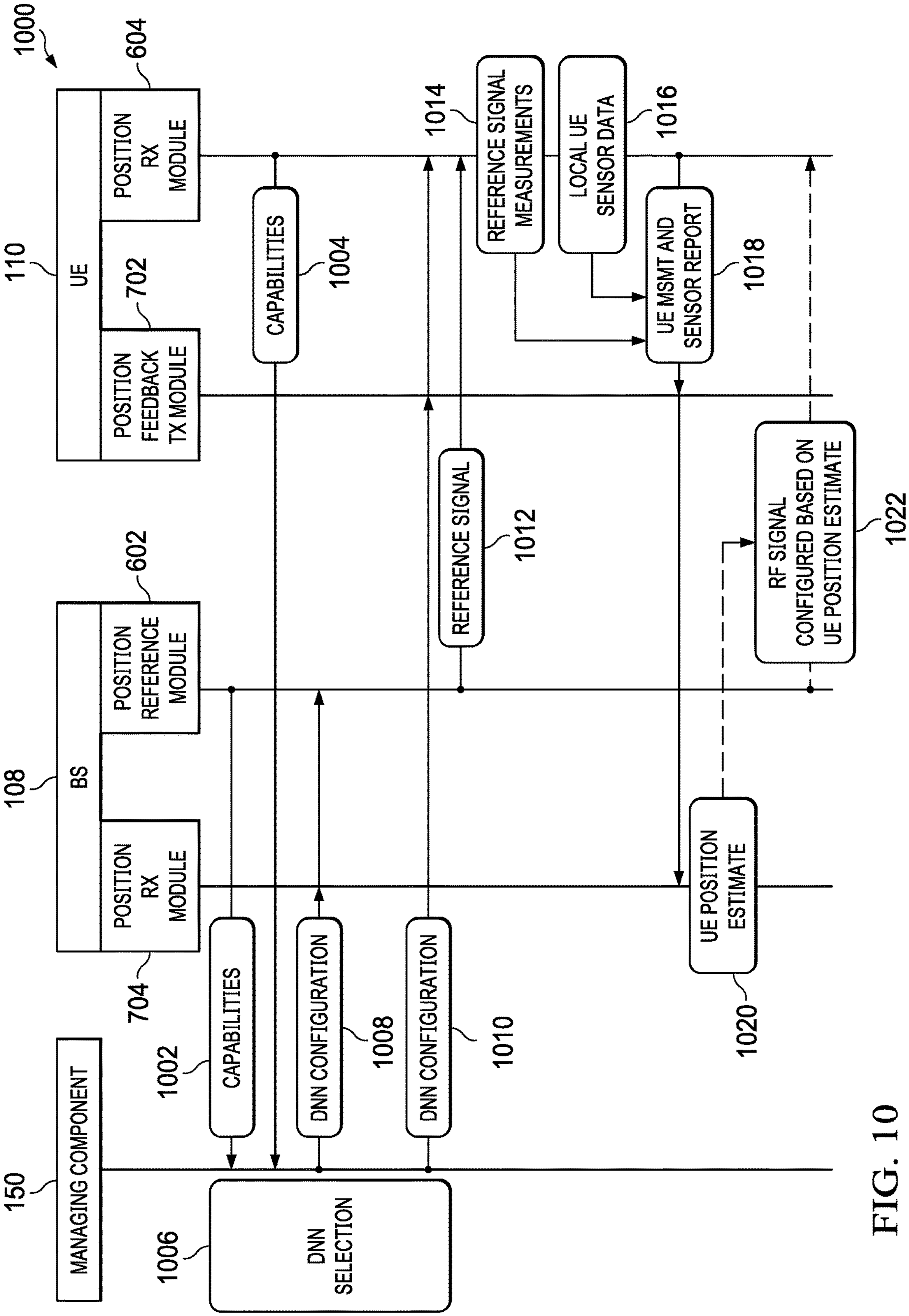
FIG. 10 is a ladder signaling diagram illustrating an example operation of the method of FIG. 9 in accordance with some embodiments.
Figure 11:
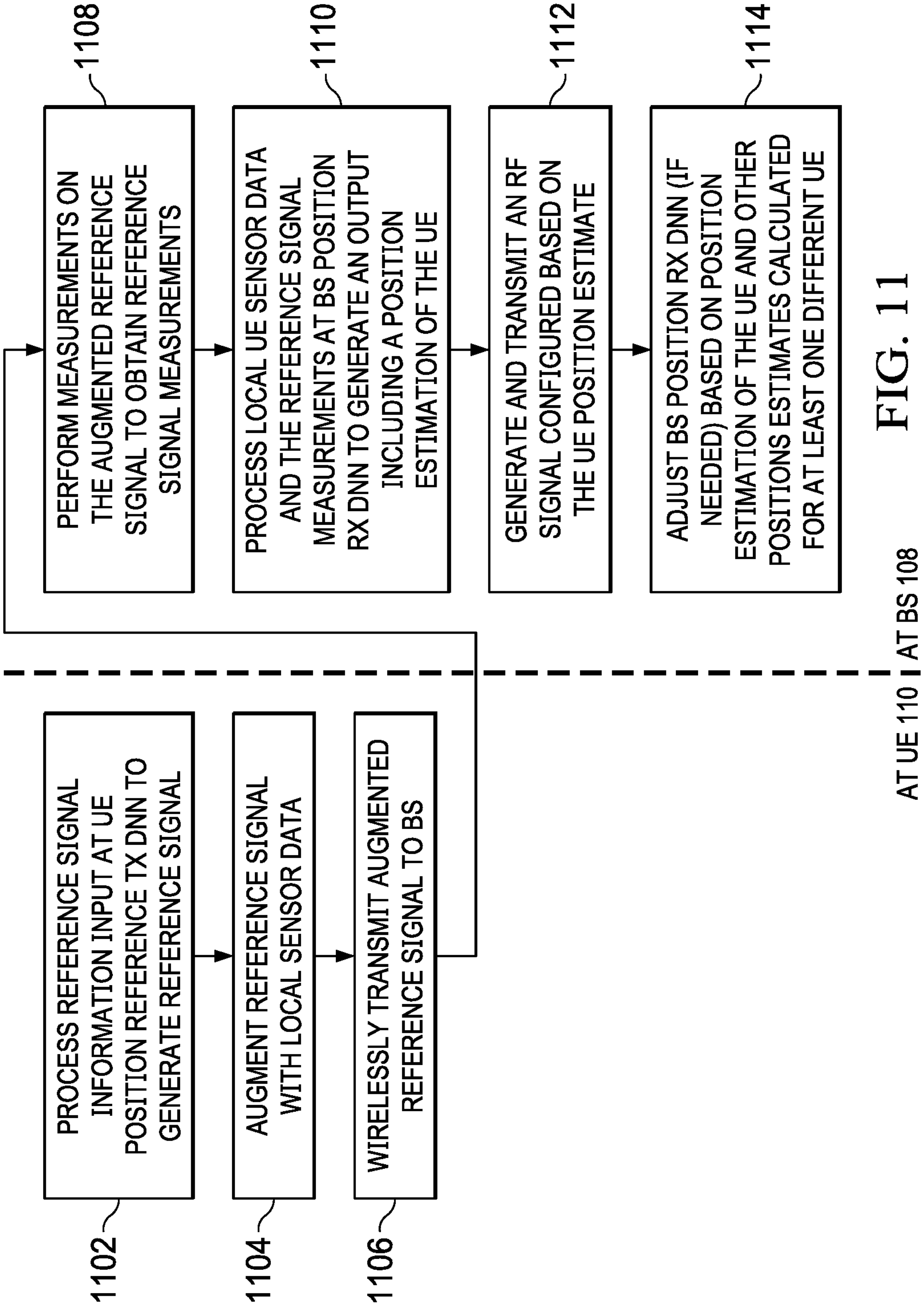
FIG. 11 is a flow diagram illustrating another example method for calculating a UE position estimate using a selected and jointly trained set of neural networks in accordance with some embodiments.
Figure 12:
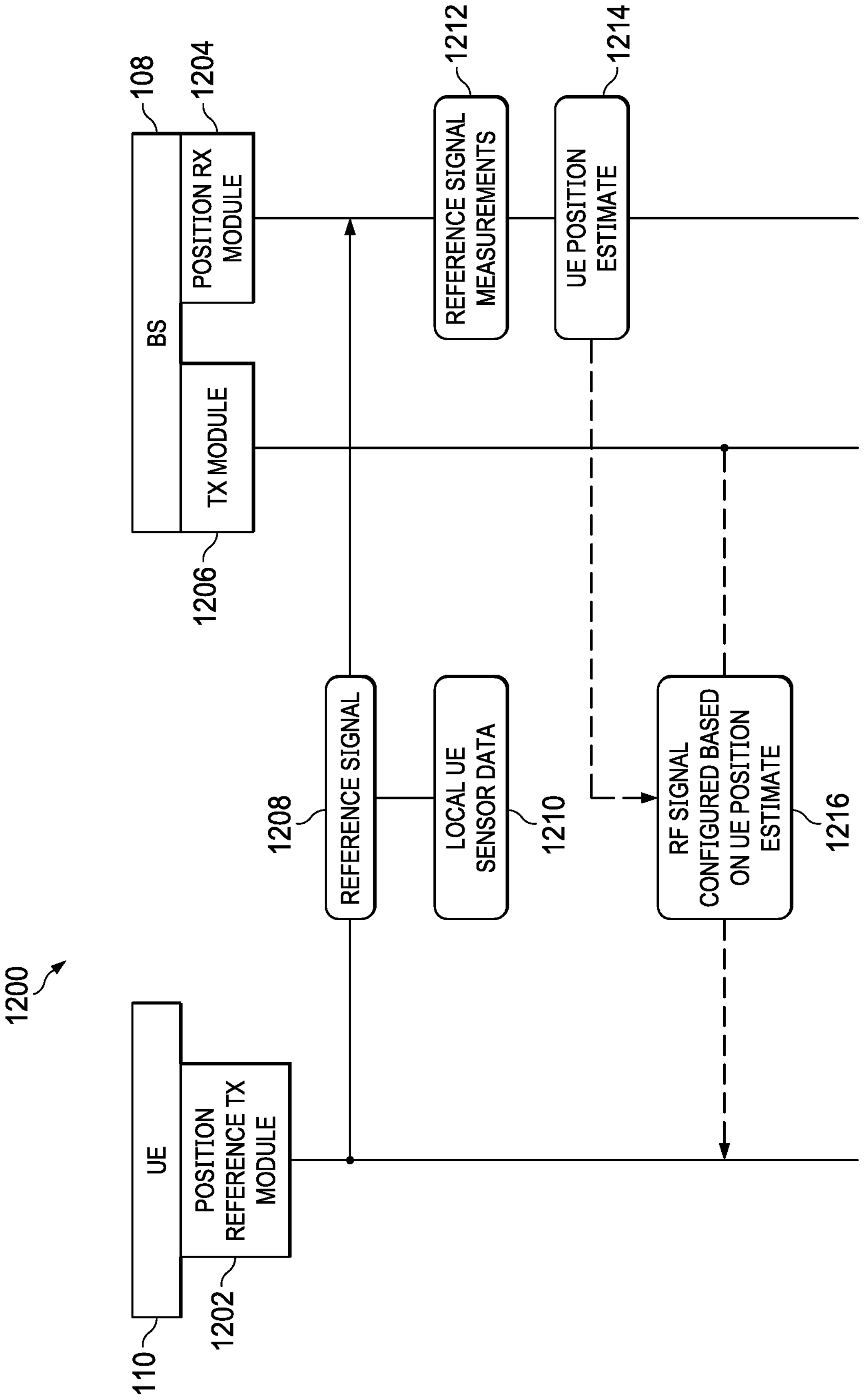
FIG. 12 is a ladder signaling diagram illustrating an example operation of the method of FIG. 11 in accordance with some embodiments.

FIGS. 9 and 10 together illustrate an example method 900 for RAT-assisted UE positioning using a jointly trained DNN-based UE positioning path between wireless devices in accordance with some embodiments. For ease of discussion, the method 900 of FIG. 9 is described below in the example context of the UE positioning path 116 of FIGS. 1, 6, and 7. Further, the processes of method 900 are described with reference to the example transaction (ladder) diagram 1000 of FIG. 10. Method 900 initiates at block 902 with the BS 108 and the UE 110 establishing a wireless connection, such as via a 5G NR stand-alone registration/attach process in a cellular context or via an IEEE 802.11 association process in a wireless local area network (WLAN) context. At block 904, the managing component 150 obtains capability information from each of the BS 108 and the UE 110, such as capability information 1002 (FIG. 10) provided by the capabilities management module 320 (FIG. 3) of the BS 108 and the capability information 1004 (FIG. 10) provided by the capabilities management module 218 (FIG. 2) of the UE 110. In at least some embodiments, the managing component 150 may already be informed of the capabilities of the BS 108 when it is part of the same infrastructure network, in which case obtaining the capability information 1002 for the BS 108 can include accessing a local or remote database or other data store for this information. For the UE 110, the BS 108 can send a capabilities request to the UE 110, and the UE 110 responds to this request with the capability information 1004, which the BS 108 then forwards to the managing component 150. For example, the BS 108 can send a UECapabilityEnquiry RRC message, which the UE 110 responds to with a UECapabilityInformation RRC message that contains the CSI-relevant capability information.

At block 906, the neural network selection module 410 of the managing component 150 uses, for example, the capability information and other information representative of the UE positioning configuration between the BS 108 and the UE 110 to select a pair of UE positioning DNN architectural configurations to be implemented at the BS 108 and the UE 110 for supporting the UE positioning path 116 (DNN selection 1006, FIG. 10). In at least some embodiments, the neural network selection module 410 employs an algorithmic selection process in which the capability information obtained from the BS 108 and UE 110 and the UE positioning configuration parameters of the UE positioning path 116 are compared to the attributes of pairs of candidate neural network architectural configurations 414 in the set 412 to identify a suitable pair of DNN architectural configurations. In other embodiments, the neural network selection module 410 may organize the candidate DNN architectural configurations in one or more LUTs, with each entry storing a corresponding pair of DNN architectural configurations and being indexed by a corresponding combination of input parameters or parameter ranges and, thus, the neural network selection module 410 may select a suitable pair of DNN architectural configurations to be employed by the BS 108 and the UE 110 via the provision of the capabilities and UE positioning configuration parameters identified at block 904 as inputs to the one or more LUTs. In at least some embodiments, the managing component 150 obtains updated capability information from the BS 108 and the UE 110, as illustrated by blocks 901 and 903. The managing component 150 can then select different DNN architectures for one or more of the BS 108 or UE 110 based on the updated capability information.

Further at block 906, the managing component 150 directs the BS 108 and the UE 110 to implement their respective DNN architectural configuration from the selected jointly trained pair of DNN architectural configurations. In implementations in which each of the BS 108 and the UE 110 stores candidate DNN architectural configurations for potential future use, the managing component 150 can transmit a message with an identifier of the DNN architectural configuration to be implemented by the BS 108 and the UE 110. Otherwise, the managing component 150 can transmit information representative of the DNN architectural configuration as, for example, a Layer 1 signal, a Layer 2 control element, a Layer 3 RRC message, or a combination thereof. For example, with reference to FIG. 10, the managing component 150 sends to the BS 108 a DNN configuration message 1008 that contains data representative of the DNN architectural configuration selected for the BS 108. In response to receiving this message, the neural network management module 314 of the BS 108 extracts the data from the DNN configuration message 1008 and configures one or more of the BS position reference signal TX processing module 602 or the BS positioning RX processing module 704 to implement one or more DNNs having the DNN architectural configuration represented in the extracted data. Similarly, the managing component 150 sends to the UE 110 a DNN configuration message 1010 (FIG. 10) that includes data representative of the DNN architectural configuration selected for the UE 110. In response to receiving this message, the neural network management module 216 of the UE 110 extracts the data from the DNN configuration message 1010 and configures one or more of the UE position reference signal RX processing module 604 or the UE position feedback TX processing module 702 to implement one or more DNNs having the DNN architectural configuration represented in the extracted data.

With the DNNs of the UE positioning path 116 being initially configured, the RAT-assisted UE positioning process can begin. Accordingly, at block 908 the BS position reference signal TX processing module 602 receives reference signal information 122 from the BS reference signal management module 316 as input, and from this input, generates and configures a corresponding reference signal 1012 (FIG. 10) output(s). As described above with reference to FIG. 6, the reference signal information 122 includes one or more different types of information, such as BS and/or UE operating characteristics or reference signal parameters, that the DNN(s) of the BS position reference signal TX processing module 602 utilizes as input to generate and configure one or more reference signals 1012. The reference signal information 122 may also include information regarding the UE positioning configuration of the UE positioning path 116, such as the particular beams, antennas, subcarriers, etc., to be employed. At block 910, the BS position reference signal TX processing module 602 provides for the wireless transmission of the reference signal 1012 to the UE 110.

At block 912, the reference signal 1012 is received and processed by the RF front end 204 of the UE 110, and the reference signal measurement module 220 of the UE 110 performs one or more reference signal measurements 1014 (FIG. 10), such as RSRP, RSTD, OTDOA, UTDOA, TDAV, AoA, AOD, RTT, and the like, on the resulting output. At block 914 the UE position reference signal RX processing module 604 of the UE 110 receives the reference signal measurements 1014 and, in some embodiments, UE sensor data 1016 (FIG. 10) as input. In at least some embodiments, the UE position reference signal RX processing module 604 receives the reference signal 1012 as input and performs the reference signal measurements 1014 compared to receiving the reference signal measurements 1014 from the reference signal measurement module 220. From these inputs, the UE position reference signal RX processing module 604 generates a corresponding UE measurement and sensor report 1018 (FIG. 10) output that fuses the UE sensor data 1016 with the UE reference signal measurements 1014. In at least some embodiments, the UE position reference signal RX processing module 604 does not receive the UE sensor data 1016 as an input. In these embodiments, the UE position reference signal RX processing module 604 generates a corresponding UE measurement output (as compared to a corresponding UE measurement and sensor report output).

At block 916, the UE position feedback TX processing module 702 of the UE 110 receives the UE measurement and sensor report 1018 as an input, and from this input generates a corresponding output signal representing the UE measurement and sensor report 144 for wireless transmission to the BS 108. The UE 110 can use various messaging mechanisms, such as the RRC protocol, LPP, and the like, for configuring and transmitting the wireless communication. At block 918, the output signal representing the UE measurement and sensor report 1018 is received and processed by the RF front end 304 of the BS 108, and to provide the UE measurement and sensor report 1018 as an input to the BS position RX processing module 704 of the BS 108. The BS position RX processing module 704 processes the UE measurement and sensor report 1018, which, in at least some embodiments, includes UE reference signal measurements 1014 and UE sensor data 1016, to generate an output representative of a position estimate 1020 (FIG. 10) for the UE 110. As described above with reference to FIG. 6, the UE position estimate 1020, in at least some embodiments, not only incorporates the reference signal measurement(s) 1014 provided by the UE 110 but also incorporates the UE sensor data 1016, resulting in a UE position estimate that includes, for example, a local circumstance of the UE 110, an indication of the UE orientation, second-order information, such as movement (e.g., rotation, heading, etc.), and/and the like.

At block 920, the BS position reference signal TX processing module 602 or other TX processing module of the BS 108 optionally generates and transmits an RF signal 1022 (FIG. 10) that is configured based on the UE position estimate 1020 to the UE 110 (or other network component). At block 922 the neural network management module 216 of the BS 108 or the neural network selection module 410 of the managing component 150 optionally adjusts one or more of the DNNs of the BS position RX processing module 704 based on the UE position estimate 1020 calculated for the current UE 110 and the UE position estimates calculated for one or more other UEs 110. For example, the BS 108 or the managing component 150 determines if the UE position estimate 1020 calculated for the current UE 110 and the UE position estimates calculated for one or more other UEs 110 indicates that the UEs 110 occupy the same physical space. If so, the BS 108 or the managing component 150 determines that the BS position RX processing module 604 has made a positioning error and needs to be refined since multiple UEs 110 cannot occupy the same physical space. The BS 108 or the managing component 150 can adjust one or more parameters, such as the weights, of the BS position RX processing module 704 (or any of the remaining process modules of the BS 108 or UE 110) to correct the identified positioning error.

Although method 900 of FIG. 9 and the corresponding example operation of ladder diagram 1000 of FIG. 10 illustrate an implementation having a BS 108 transmit a reference signal and a UE 110 perform reference signal measurements, the UE 110 can be similarly configured to transmit a reference signal, and the BS 108 can be configured to perform the reference signal measurements. For example, FIGS. 11 and 12 together illustrate an example method 1100 for RAT-assisted UE positioning using a jointly trained DNN-based UE positioning path between wireless devices in accordance with an embodiment having a UE 110 configured to transmit a reference signal and a BS 108 configured to perform the reference signal measurements. The processes of method 1100 are described with reference to the example transaction (ladder) diagram 1200 of FIG. 12. Method 1100 initiates at block 1102, which can be after block 906 of method 900 such that the DNNs of the BS 108 and UE 110 are already initially configured.

Accordingly, at block 1102 a UE position reference signal TX processing module 1202 (FIG. 12) receives reference signal information 122 as input, and from this input, generates and configures a corresponding modulated reference signal 1208 (FIG. 12) output. As described above with reference to FIG. 6, the reference signal information 122 includes one or more different types of information, such as BS and/or UE operating characteristics or reference signal parameters, that the DNN(s) of the UE position reference signal TX processing module 1202 utilizes as input to generate and configure one or more reference signals 1208. At block 1104, the UE position reference signal TX processing module 1202 further receives local UE sensor data 1210 (FIG. 12) from one or more sensors available at the UE 110. Further at block 1104, the UE position reference signal TX processing module 1202 augments the reference signal 1208 with the sensor data 1210 and generates an output representing the augmented reference signal 1208. In at least some embodiments, the reference signal is an SRS augmented with the sensor data 1210. At block 1106, the UE position reference signal TX processing module 1202 provides for the wireless transmission of the augmented reference signal 1208 to the BS 108.

At block 1108, the reference signal 1208 is received and processed by the RF front end 304 of the BS 108, and a reference signal measurement module (not shown) of the BS 108 performs one or more reference signal measurements 1212 (FIG. 12), such as RSRP, RSTD, OTDoA, UTDoA, TDAV, AoA, AOD, RTT, and the like, on the resulting output. At block 1110 a BS position reference signal RX processing module 1204 (or other processing module) of the BS 108 receives the reference signal measurements 1212 and the UE sensor data 1210 transmitted with the reference signal 1208 as input, and from these inputs generates an output representative of a position estimate 1214 (FIG. 12) for the UE 110. In at least some embodiments, the BS position reference signal RX processing module 1204 receives the reference signal 1208 as an input for calculating the reference signal measurements 1212 compared to receiving the reference signal measurements 1212 as an input. The UE position estimate 1214, in at least some embodiments, incorporates both the reference signal measurement 1212 and the UE sensor data 1210, resulting in a UE position estimate that includes, for example, a local circumstance of the UE 110, an indication of the UE orientation, second-order information, such as movement (e.g., rotation, heading, etc.), and/and the like.

At block 1112, a BS TX processing module 1206 of the BS 108 optionally generates and transmits an RF signal 1216 (FIG. 12) that is configured based on the UE position estimate 1214 to the UE 110 (or other network component). At block 1114 the neural network management module 216 of the BS 108 or the neural network selection module 410 of the managing component 150 optionally adjusts one or more of the DNNs of the BS position RX processing module 704 based on the UE position estimate 1214 calculated for the current UE 110 and the UE position estimates calculated for one or more other UEs 110 similar to the process discussed above with respect to block 922 of FIG. 9.

In at least some embodiments, certain aspects of the techniques described above may be implemented by one or more processors of a processing system executing software. The software includes one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM), or other non-volatile memory device or devices, and the like. The executable instructions stored on the non-transitory computer-readable storage medium may be in source code, assembly language code, object code, or another instruction format that is interpreted or otherwise executable by one or more processors.

A computer-readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectro-mechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A computer-implemented method, in a first device, comprising:

receiving reference signal information as an input to a transmit neural network of the first device;

generating, by the transmit neural network according to a first neural network architectural configuration, a first output based on the reference signal information, the first output representing a reference signal;

controlling a radio frequency (RF) antenna interface of the first device to transmit a first RF signal representative of the first output for receipt by a second device;

responsive to transmitting the first RF signal, receiving, at a receive neural network of the first device, an input representing one or more RF signals associated with the second device; and generating, by the receive neural network according to a second neural network architectural configuration, a second output representing a position estimate of the second device based on the input to the receive neural network.

2. The method of claim 1, wherein receiving the input representing one or more RF signals associated with the second device comprises:

receiving a second RF signal from the second device representing signal measurements associated with the first RF signal.

3. The method of claim 2, wherein the second RF signal received from the second device further represents local sensor data generated at the second device.

4. The method of claim 1, wherein the position estimate indicates a location of the second device and an orientation of the second device.

5. The method of claim 1, further comprising:

selecting at least one of the first neural network architectural configuration or the second neural network architectural configuration from a plurality of neural network architectural configurations based on one or more capabilities of at least one of the first device or the second device.

6. The method of claim 5, wherein selecting the first neural network architectural configuration comprises:

receiving information from the second device representing one or more capabilities of the second device; and using the information to select the first neural network architectural configuration.

7. The method of claim 5, further comprising:

selecting the second neural network architectural configuration from the plurality of neural network architectural configurations based on one or more capabilities of at least one of the first device or the second device.

8. The method of claim 1, further comprising:

receiving a command from a managing infrastructure component to implement at least one of the first neural network architectural configuration for the transmit neural network or the second neural network architectural configuration for the receive neural network.

9. The method of claim 1, further comprising:

responsive to a change in one or more capabilities of at least one of the first device or the second device, selecting at least one of a third neural network architectural configuration for the transmit neural network or a fourth neural network architectural configuration for the receive neural network.

10. The method of claim 1 further comprising:

participating in joint training of the transmit neural network and the receive neural network of the first device with a transmit neural network and a receive neural network of the second device.

11. The method of claim 1, further comprising:

communicating with a third device implementing a transmit neural network; and configuring the transmit neural network of the third device to generate an output representing a reference signal for receipt by the second device.

12. The method of claim 1, further comprising:

generating, at the receive neural network of the first device, a third output representing a position estimate of a third device based on one or more RF signals received from the third device;

determining, at the receive neural network of the first device, the second output and the third output indicate that the second device and the third device occupy the same space; and responsive to the second output and the third output indicating the second device and the third device occupy the same space, refining one or more parameters of the receive neural network of the first device.

13. A computer-implemented method, in a first device, comprising:

receiving, at a radio frequency (RF) antenna interface of the first device, a first RF signal from a second device, the first RF signal representative of a reference signal;

providing a representation of the first RF signal as a first input to a receive neural network of the first device; and generating, by the receive neural network, a first output representing a measurement report at the first device based on the first input to the receive neural network, including performing one or more reference signal measurements on the first input representing the reference signal, the measurement report comprising at least one of the one or more reference signal measurements.

14. The method of claim 13, further comprising:

receiving as an input, at a transmit neural network of the first device, the first output from the receive neural network;

generating, by the transmit neural network, a second output representing the measurement report; and controlling the RF antenna interface of the first device to transmit a second RF signal representative of the second output for receipt by the second device.

15. The method of claim 13, further comprising:

providing a representation of sensor data generated by one or more sensors of the first device as a second input to the receive neural network of the first device, wherein the measurement report comprises the one or more reference signal measurements fused with the sensor data.

16. The method of claim 14, further comprising:

receiving a command from a network infrastructure component to implement at least one of a first neural network architectural configuration for the receive neural network or a second neural network architectural configuration for the transmit neural network.

17. The method of claim 16, further comprising:

responsive to a change in one or more capabilities of the first device, transmitting a message to the network infrastructure component indicating the change in the one or more capabilities; and responsive to transmitting the message, receiving from the network infrastructure component, a second neural network architectural configuration for at least one of the receive neural network or the transmit neural network.

18. A device comprising:

a radio frequency (RF) antenna interface;

at least one processor coupled to the RF antenna interface; and a memory storing executable instructions, the executable instructions configured to manipulate the at least one processor to:

receive reference signal information as an input to a transmit neural network;

generating, by the transmit neural network according to a first neural network architectural configuration, a first output based on the reference signal information, the first output representing a reference signal;

control the radio frequency (RF) antenna interface to transmit a first RF signal representative of the first output for receipt by another device;

responsive to transmitting the first RF signal, receive, at a receive neural network of the device, an input representing one or more RF signals associated with the other device; and generating, by the receive neural network according to a second neural network architectural configuration, a second output representing a position estimate of the, other device based on the input to the receive neural network.

* * * * *